United States Patent
Ode et al.

(10) Patent No.: US 9,118,381 B2
(45) Date of Patent: Aug. 25, 2015

(54) MOBILE COMMUNICATION SYSTEM, RADIO RELAY APPARATUS, MOBILE COMMUNICATION APPARATUS, AND RADIO COMMUNICATION METHOD

(75) Inventors: Takayoshi Ode, Yokohama (JP); Yoshihiro Kawasaki, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 13/618,367

(22) Filed: Sep. 14, 2012

(65) Prior Publication Data
US 2013/0023204 A1 Jan. 24, 2013

Related U.S. Application Data

(63) Continuation of application No. PCT/JP2010/055627, filed on Mar. 30, 2010.

(51) Int. Cl.
*H04B 7/15* (2006.01)
*H04B 7/155* (2006.01)
*H04W 88/04* (2009.01)

(52) U.S. Cl.
CPC ........... *H04B 7/15507* (2013.01); *H04W 88/04* (2013.01)

(58) Field of Classification Search
CPC .................................................... H04W 88/04
USPC ................... 455/11.1, 3.02, 12.1, 13.1, 13.4
See application file for complete search history.

(56) References Cited

U.S. PATENT DOCUMENTS

| 2004/0242154 A1 | 12/2004 | Takeda et al. |
| 2006/0046643 A1 | 3/2006 | Izumikawa et al. |
| 2006/0205340 A1* | 9/2006 | Cho et al. ..................... 455/11.1 |
| 2008/0075094 A1 | 3/2008 | Ahn et al. |

(Continued)

FOREIGN PATENT DOCUMENTS

| CA | 2455586 | 12/2003 |
| EP | 1509050 | 2/2005 |

(Continued)

OTHER PUBLICATIONS

3GPP TR 36.814 v1.5.0 (Nov. 2009); 3rd Generation Partnership Project; Technical Specification Group Radio Access Network; "Further Advancements for E-UTRA Physical Layer Aspects (Release 9)"; Nov. 2009.

(Continued)

*Primary Examiner* — Sanh Phu
(74) *Attorney, Agent, or Firm* — Myers Wolin, LLC

(57) ABSTRACT

A base station apparatus includes a first generating unit that generates first broadcast information for use in processing by a mobile communication apparatus that connects to the base station apparatus and in processing by another mobile communication apparatus that connects to a radio relay apparatus, and a first transmitting unit that transmits the first broadcast information. The radio relay apparatus includes a second generating unit that generates second broadcast information for use in processing by the other mobile communication apparatus, and a second transmitting unit that transmits the second broadcast information. The other mobile communication apparatus includes a receiving unit that receives the first broadcast information and the second broadcast information, and a control unit that controls radio communication performed via the radio relay apparatus, using the received first and second broadcast information.

17 Claims, 21 Drawing Sheets

(56) References Cited

U.S. PATENT DOCUMENTS

2008/0112365 A1    5/2008   Kwun et al.
2009/0227258 A1    9/2009   Youn et al.
2010/0106797 A1*   4/2010   Nagaraja .................. 709/217

FOREIGN PATENT DOCUMENTS

| | | |
|---|---|---|
| EP | 1701490 | 9/2006 |
| JP | 2004-248210 | 9/2004 |
| JP | 2006-074325 | 3/2006 |
| JP | 2008-066827 | 3/2008 |
| JP | 2008-109614 | 5/2008 |
| JP | 2008-532454 | 8/2008 |
| WO | 03/101132 | 12/2003 |
| WO | 2006/096008 | 9/2006 |

OTHER PUBLICATIONS

International search report issued for corresponding International Patent Application No. PCT/JP2010/055627 mailed Jun. 29, 2010.
Office Action issued for corresponding Taiwan Patent Application No. 099109585, dated Feb. 21, 2014, with an English translation.

* cited by examiner

MOBILE COMMUNICATION SYSTEM, RADIO RELAY APPARATUS, MOBILE COMMUNICATION APPARATUS, AND RADIO COMMUNICATION METHOD

CROSS-REFERENCE TO RELATED APPLICATION

This application is a continuation application of International Application PCT/JP2010/055627 filed on Mar. 30, 2010 and designated the U.S., the entire contents of which are herein wolly incorporated by reference.

FIELD

The embodiments discussed herein are related to a mobile communication system, a radio relay apparatus, a mobile communication apparatus, and a radio communication method.

BACKGROUND

Currently, mobile communication systems such as cellular phone systems and wireless metropolitan area networks (MANs) are widely used. Meanwhile, in order to increase the speed and capacity of radio communication, lively discussions have been taking place about the next-generation mobile communication technology.

In many mobile communication systems, a radio relay apparatus for relaying radio communication is provided between a base station apparatus and mobile communication apparatuses. The provision of the radio relay station apparatus makes it possible to cover areas (dead spots) where radio communication is difficult due to blockage by buildings or the like, increase the size of the cell managed by the base station apparatus, and improve the throughput. Some of such radio relay apparatuses manage cells that are independent from the cell managed by a base station apparatus, and behave like a base station toward mobile communication apparatuses. For example, a method has been proposed that assigns to a cell of a radio relay apparatus a cell ID different from that of a base station apparatus. Thus, a mobile communication apparatus will not be aware of whether the cell to be accessed is a cell of the relay station apparatus or a cell of a base station apparatus (see, for example, 3rd Generation Partnership Project (3GPP), "Further Advancements for E-UTRA Physical Layer Aspects (Release 9)", TR 36.814 V1.5.0, Section 9, November 2009).

With regard to a radio network where radio communication is performed via a plurality of nodes, there has been proposed a technique in which a node transmits a sub-frame including broadcast information to another node. This sub-frame includes information such as identification information of the node, the transmission power level of the node, and route information from a core node (base station apparatus) to the node (see, for example, Japanese Laid-open Patent Publication No. 2008-109614, paragraphs [0025] through [0027]).

A problem with this technique is that, in some cases, the mobile communication apparatus is unable to appropriately control communication performed via a radio relay apparatus unless the mobile communication apparatus determines whether the destination node is a base station apparatus or a radio relay apparatus.

For instance, in the case where the number of radio resources available to the relay station apparatus is less than the number of radio resources available to the base station apparatus, the mobile communication apparatus preferably performs communication control taking this restriction into account. This also applies to the case where the timing at which radio communication between the radio relay apparatus and the mobile communication apparatus is not performed is determined in advance so as to prevent radio interference. Further, in the case where the transmission power of the relay station apparatus is different from that of the base station apparatus, the mobile station apparatus preferably performs quality measurement taking the difference in the transmission power into account. Furthermore, because the transmission delay time between the base station apparatus and the mobile communication apparatus varies depending on whether communication is performed via the relay station apparatus, the mobile station apparatus preferably performs delay control taking the presence of the radio relay station apparatus into account.

SUMMARY

According to an aspect of the invention, there is provided a mobile communication system including a base station apparatus; a radio relay apparatus; and a plurality of mobile communication apparatuses. The base station apparatus includes a first generating unit configured to generate first broadcast information to be used in processing by a first of the mobile communication apparatuses that connects to the base station apparatus and in processing by a second of the mobile communication apparatuses that connects to the radio relay apparatus; and a first transmitting unit configured to transmit the first broadcast information. The radio relay apparatus includes a second generating unit configured to generate second broadcast information to be used in processing by the second mobile communication apparatus; and a second transmitting unit configured to transmit the second broadcast information. The second mobile communication apparatus includes a receiving unit configured to receive the first broadcast information and the second broadcast information; and a control unit configured to control radio communication performed through connection to the radio relay apparatus, using the received first broadcast information and second broadcast information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
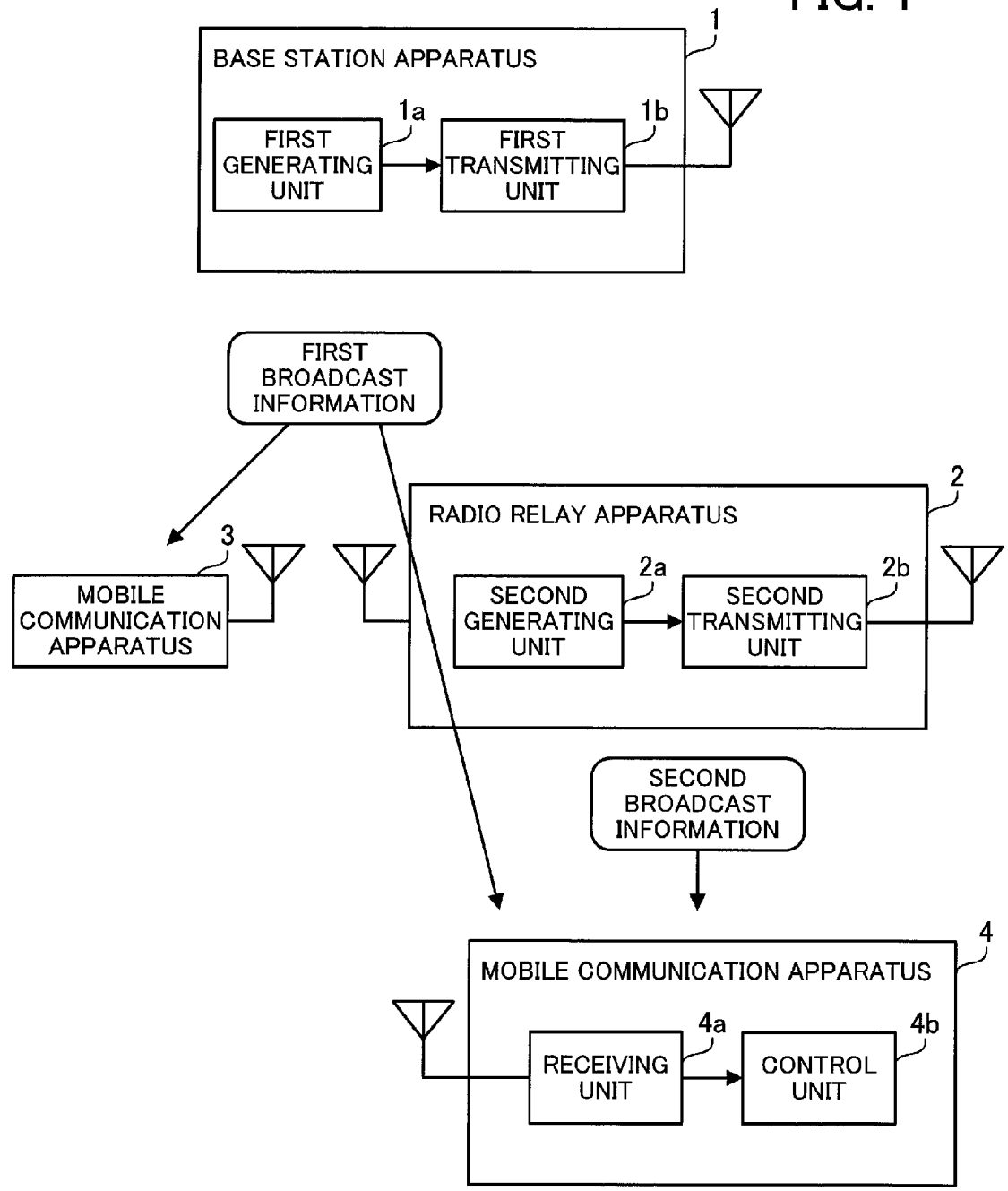
FIG. 1 illustrates a mobile communication system according to a first embodiment.

Embodiments will be described below with reference to the accompanying drawings, wherein like reference numerals refer to like elements throughout.

(A) First Embodiment

FIG. 1 illustrates a mobile communication system according to a first embodiment. The mobile communication system of the first embodiment includes a base station apparatus 1, a radio relay apparatus 2, and mobile communication apparatuses 3 and 4.

The base station apparatus 1 communicates with the mobile communication apparatuses 3 and 4 directly or via the radio relay apparatus 2. The radio relay apparatus 2 relays communication between the base station apparatus 1 and the mobile communication apparatuses 3 and 4. The radio relay apparatus 2 may be a fixed radio communication apparatus or may be a mobile communication apparatus. Another radio relay apparatus may be interposed between the base station apparatus 1 and the radio relay apparatus 2. The mobile communication apparatuses 3 and 4 perform radio communication by connecting to the base station apparatus 1 or the radio relay apparatus 2. In the following, it is assumed that the mobile communication apparatus 3 connects to the base station apparatus 1, while the mobile communication apparatus 4 connects to the radio relay apparatus 2.

The base station apparatus 1 includes a first generating unit 1a and a first transmitting unit 1b. The first generating unit 1a generates first broadcast information. The first broadcast information is information commonly used by the mobile communication apparatus 3 that connects to the base station apparatus 1 and the mobile communication apparatus 4 that connects to the radio relay apparatus 2. The first broadcast information may include information indicating the bandwidth of a frequency band used by the mobile communication system, for example. The first transmitting unit 1b transmits (broadcasts) the first broadcast information generated by the first generating unit 1a. The first broadcast information is transmitted on a broadcast channel, for example.

The radio relay apparatus 2 includes a second generating unit 2a and a second transmitting unit 2b. The second generating unit 2a generates second broadcast information. The mobile communication apparatus 4 that connects to the radio relay apparatus 2 uses the second broadcast information, but the mobile communication apparatus 3 that connects to the base station apparatus 1 does not have to use the second broadcast information. The second broadcast information includes information about a radio resource available to the radio relay apparatus 2, information about the timing at which the radio relay apparatus 2 performs radio communication, information indicating the transmission power of the radio relay apparatus 2, and information indicating the number of relays in radio communication, for example. The second transmitting unit 2b transmits (broadcasts) the second broadcast information generated by the second generating unit 2a. The second broadcast information is transmitted on a broadcast channel, for example.

Upon broadcasting the second broadcast information, the radio relay apparatus 2 may transfer the first broadcast information generated and transmitted by the base station apparatus 1. That is, the radio relay apparatus 2 having received the first broadcast information from the base station apparatus 1 may retransmit the received first broadcast information on the broadcast channel of the radio relay apparatus 2. In this case, the radio relay apparatus 2 may demodulate and decode the first broadcast information received from the base station apparatus 1, and transfer the first broadcast information after coding and modulating the first broadcast information again. The first broadcast information and the second broadcast information may be transmitted on the same broadcast channel, or may be transmitted on different broadcast channels.

The mobile communication apparatus 4 includes a receiving unit 4a and a control unit 4b. The receiving unit 4a receives the first broadcast information from the base station apparatus 1 or the radio relay apparatus 2. The receiving unit 4a also receives the second broadcast information from the radio relay apparatus 2. The first broadcast information and the second broadcast information may be received at the same timing, or may be received at different timings. The control unit 4b controls radio communication performed through connection to the radio relay apparatus 2, using the first broadcast information and the second broadcast information received by the receiving unit 4a. The first broadcast information and the second broadcast information may be referred to upon establishing a connection to the radio relay apparatus 2, or during communication control to be performed after the connection is established.

For example, the control unit 4b recognizes that the apparatus with which the mobile communication apparatus 4 is currently communicating is a radio relay apparatus, on the basis of the information about a radio resource available to the radio relay apparatus 2 that is contained in the second broadcast information. Also, the control unit 4b specifies a time section during which radio signal processing is to be stopped, on the basis of the information about the timing at which the radio relay apparatus 2 performs radio communication, so as to reduce power consumption. Further, the control unit 4b performs quality measurement of each cell and cell selection using the information indicating the transmission power of the radio relay apparatus 2. Also, the control unit 4b performs transmission delay control between the base station apparatus 1 and the mobile communication apparatus 4 using the information indicating the number of relays in radio communication.

In the mobile communication system of the first embodiment described above, the base station apparatus 1 transmits the first broadcast information to be used in processing by the mobile communication apparatus 3 that connects to the base station apparatus 1 and the mobile communication apparatus 4 that connects to the radio relay apparatus 2. The radio relay apparatus 2 transmits the second broadcast information to be used in processing by the mobile communication apparatus 4. The mobile communication apparatus 4 receives the first broadcast information and the second broadcast information, and communicates wirelessly with the radio relay apparatus 2 on the basis of the received broadcast information.

In this way, in the case of performing radio communication through connection to the base station apparatus 1, the mobile communication apparatus 3 refers to the first broadcast information generated by the base station apparatus 1. On the other hand, in the case of performing radio communication through connection to the radio relay apparatus 2, the mobile communication apparatus 4 refers to the second broadcast information generated by the radio relay apparatus 2 in addition to the first broadcast information. This allows the mobile communication apparatus 4 to appropriately control communication performed via the radio relay apparatus 2.

Such a mobile communication system may be implemented as a Long Term Evolution-Advanced (LTE-Advanced; hereinafter abbreviated as LTE-A) system proposed by a standardization organization called 3rd Generation Partnership Project (3GPP), for example. However, the above-described radio communication method may also be applicable to other types of mobile communication systems.

(B) Second Embodiment

Figure 2:
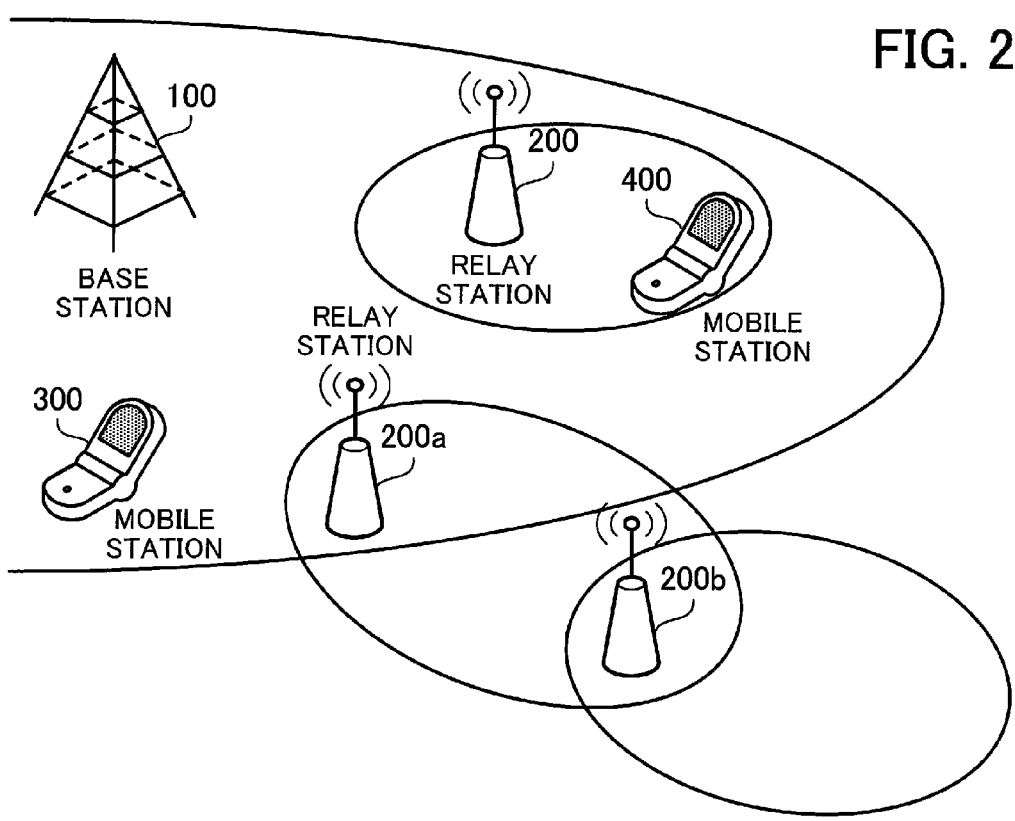
FIG. 2 illustrates a mobile communication system according to a second embodiment.

FIG. 2 illustrates a mobile communication system according to a second embodiment. The mobile communication system of the second embodiment includes a base station 100, relay stations 200, 200a, and 200b, and mobile stations 300 and 400. This mobile communication system may be implemented as an LTE-A system, for example.

The base station 100 is a radio communication apparatus that communicates wirelessly with the mobile stations 300 and 400 directly or via one or more of the relay stations 200, 200a, and 200b. The base station 100 is connected to an upper network (not shown) so as to transfer data between the upper network and the mobile stations 300 and 400. The base station 100 manages at least one cell. As described below, the base station 100 uses a plurality of (e.g., five) frequency bands called component carriers (CCs) so as to perform radio communication. It is to be noted that the base station may be referred to as a BS.

The relay stations 200, 200a, and 200b are radio communication apparatuses that can relay radio communication between the base station 100 and the mobile stations 300 and 400. Each of the relay stations 200, 200a, and 200b manages a cell that is independent from a cell of the base station 100. The cells of the base station 100 and the relay stations 200, 200a, and 200b are assigned with different cell IDs. As described below, the relay stations 200, 200a, and 200b use a part of the five component carriers (e.g., one component carrier) so as to perform radio communication. It is to be noted that the relay station may be referred to an RS or a relay node (RN).

The mobile stations 300 and 400 are radio terminal apparatuses that perform radio communication by connecting to the base station 100 or one or more of the relay stations 200, 200a, and 200b. Examples of mobile stations 300 and 400 include cell phones and mobile information terminals. The mobile stations 300 and 400 receive data from the base station 100, and transmit data to the base station 100. In the following, it is assumed that the mobile station 300 performs radio communication by connecting to the base station 100, while the mobile station 400 performs radio communication by connecting to one of the relay stations 200, 200a, and 200b (the relay station 200, for example). It is to be noted that the mobile station may be referred to as an MS.

Figure 3:
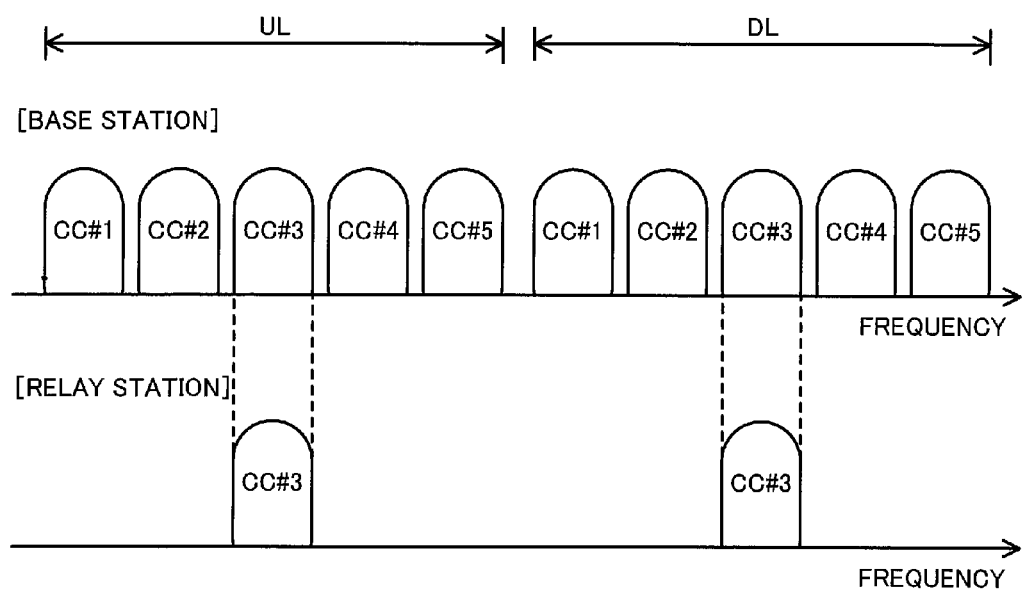
FIG. 3 illustrates exemplary settings of component carriers.

FIG. 3 illustrates exemplary settings of the component carriers. The base station 100 may use a maximum of five component carriers (the component carriers #1 through #5) to perform communication with the mobile station 300. The relay stations 200, 200a, and 200b may use a part of the component carriers #1 through #5 (the component carrier #3, for example). The number of component carriers available to the relay stations 200, 200a, and 200b is less than the number of component carriers available to the base station 100 because it is likely that each of the relay stations 200, 200a, and 200b accommodates fewer mobile stations than the base station 100.

In the case of using Frequency Division Duplex (FDD) to perform two-way communication, the frequency bands of component carriers #1 through #5 are reserved in each of the uplink (UL) and the downlink (DL). In the following, the term "component carrier" may refer to a pair of frequency bands for the downlink and the frequency band for the uplink. In both the uplink and downlink, the bandwidth of each component carrier is 20 MHz, for example, and the bandwidth of the entire mobile communication system is 100 MHz, for example. The base station 100 performs allocation (scheduling) of radio resources for each of the component carries #1 through #5. Each of the relay stations 200, 200a, and 200b performs allocation of radio resources to be used for communication with the mobile station 400.

Although two-way communication is realized using FDD in the example illustrated in FIG. 3, Time Division Duplex (TDD) may alternatively be used to realize two-way communication. In that case, five frequency bands are provided regardless of the downlink and the uplink on the frequency axis. Further, although the bandwidth of each component carrier is set to 20 MHz in the above description, each component carrier may have a bandwidth other than 20 MHz (e.g., 1.4 MHz, 3 MHz, 5 MHz, 10 MHz, 15 MHz, etc.). Also, the component carriers may have different bandwidths from each other.

Figure 4:
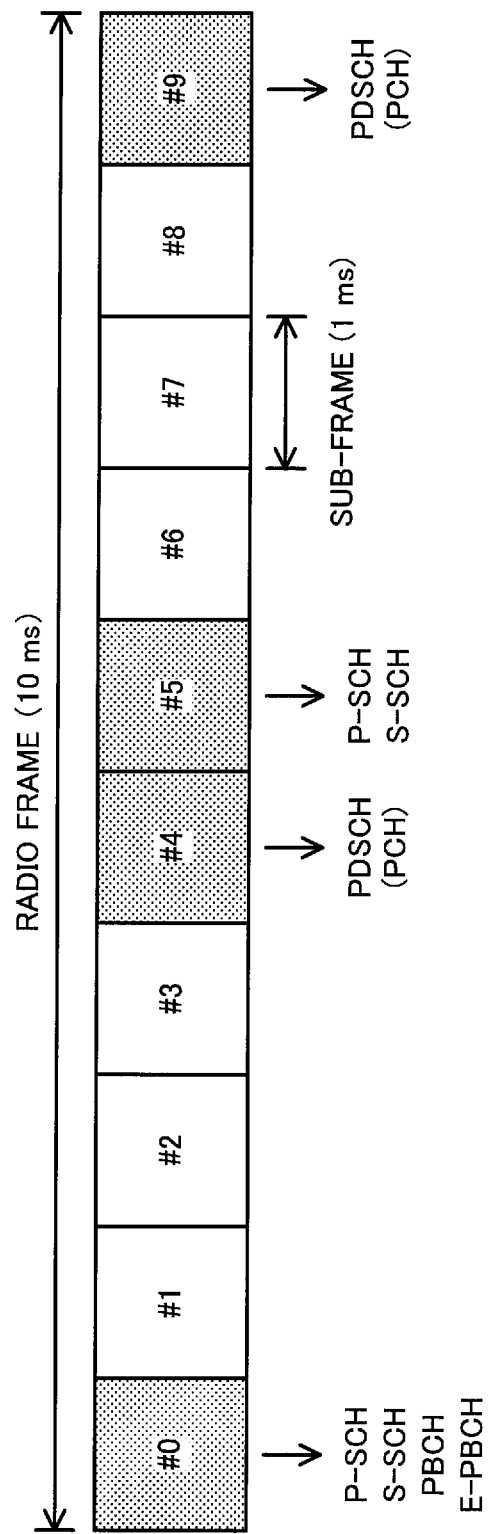
FIG. 4 illustrates an exemplary structure of a radio frame.

FIG. 4 illustrates an exemplary structure of a radio frame. On each of the component carriers #1 through #5, a radio frame as illustrated in FIG. 4 is transmitted. Radio frames transmitted between the base station 100 and the relay station 200 and radio frames transmitted between the relay station 200 and the mobile station 400 are different from each other. In this example, it is assumed that two-way communication is realized using FDD. One radio frame of 10 ms contains ten sub-frames (sub-frames #0 through #9) of 1 ms.

In the downlink radio frame, a primary synchronization channel (P-SCH) and a secondary synchronization channel (S-SCH) for transmitting synchronization signals are located in each of the sub-frames #0 and #5. A physical broadcast channel (PBCH) for transmitting broadcast information and an extended physical broadcast channel (E-PBCH) are located in the sub-frame #0. A physical downlink shared channel (PDSCH) that contains a paging channel (PCH) for transmitting information (paging information) for paging a mobile station is located in each of the sub-frames #4 and #9.

The radio resources in the radio frame are divided in the frequency direction and the time direction so as to be managed. For example, Orthogonal Frequency Division Multiple Access (OFDMA) is used for downlink frames, while Single-Carrier Frequency Division Multiple Access (SC-FDMA) and N Times Single-Carrier Frequency Multiple Access (NxSC-FDMA) are used for uplink frames. The radio resources in the frequency-time domain are allocated to various channels. Allocation of the radio resources is controlled in units of sub-frames.

In the time direction, each sub-frame includes two slots. Each slot includes seven or six symbols. An interval signal called a cyclic prefix (CP) is inserted between the symbols. There are two types of cyclic prefixes, namely, a normal cyclic prefix and an extended cyclic prefix. In the case of the normal cyclic prefix, one slot includes seven symbols. In the case of the extended cyclic prefix, one slot includes six symbols. In the frequency direction, each sub-frame includes a plurality of sub-carriers.

Figure 5:
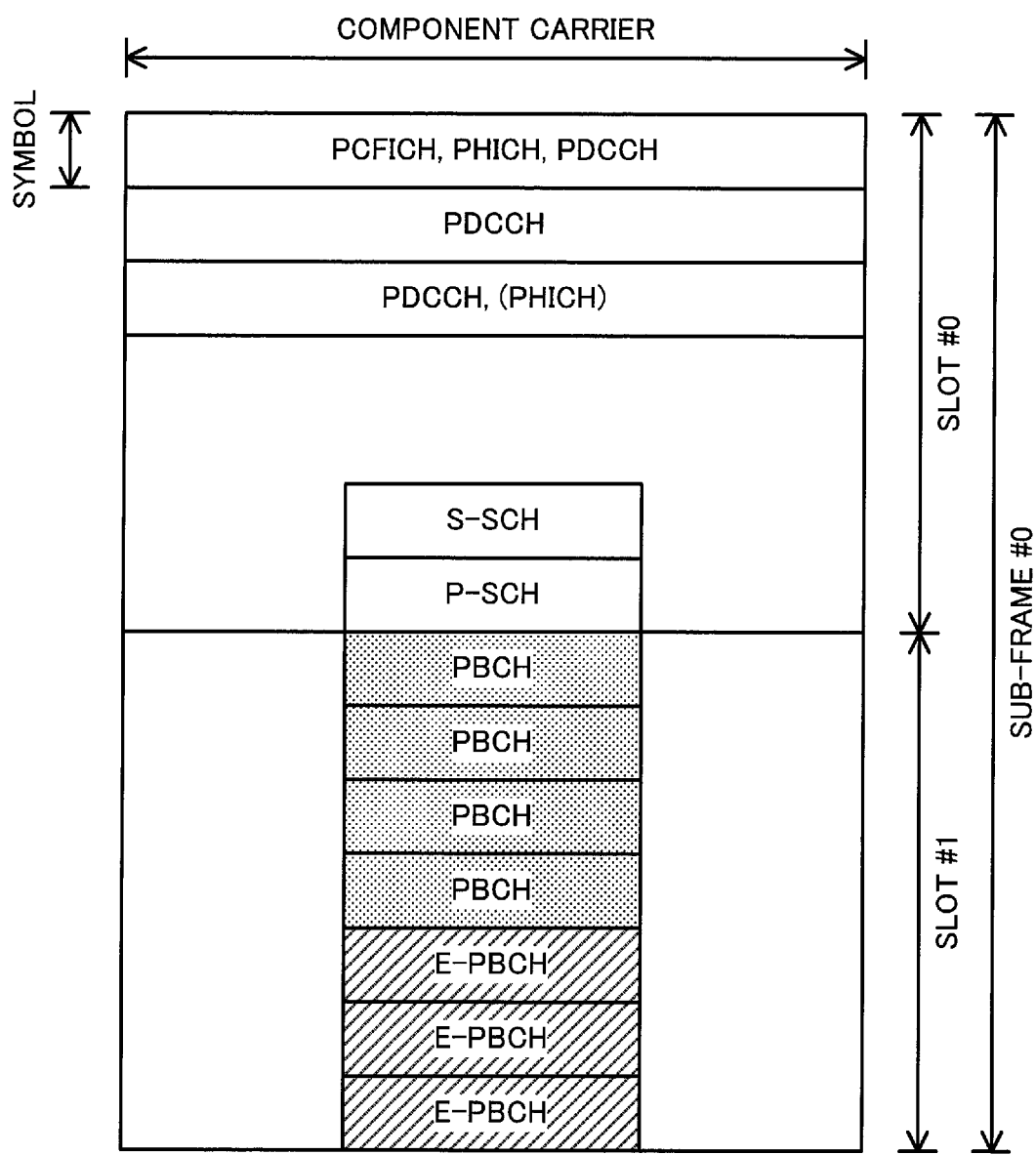
FIG. 5 is an exemplary allocation of an extended broadcast channel.

FIG. 5 is an exemplary allocation of an extended broadcast channel. In FIG. 5, the horizontal direction represents the frequency direction, while the vertical direction represents the time direction. FIG. 5 illustrates the case where a normal cyclic prefix is used as a cyclic prefix (i.e., the case where seven symbols are included in one slot).

A physical control format indicator channel (PCFICH) and a physical hybrid automatic repeat request indicator channel (PHICH) are located in a first symbol of a first half slot (slot #0) in the sub-frame #0. The PCFICH is a channel for reporting the number of symbols to be used for a physical downlink control channel (PDCCH). The PHICH is a channel for returning an acknowledge (ACK) response or a negative acknowledge (NACK) response with respect to reception of data. The PHICH may be located in a third symbol.

The above-described PDCCH is located in the first symbol of the slot #0. The PDCCH is a channel for transmitting Layer 1/Layer 2 (L1/L2) control information. PDCCH may also be located in second and third symbols. The number of symbols for PDCCH may vary in a range from 1 to 3.

Further, the S-SCH is located in a sixth symbol of the slot #0, and the P-SCH is located in a seventh symbol of the slot #0. The P-SCH is a channel on which any one of a predetermined number of (e.g., 3) primary synchronization signal sequences is transmitted. The S-SCH is a channel on which any one of a predetermined number of (e.g., 168) secondary synchronization signal sequences is transmitted. Combinations (e.g., 3×168=504 combinations) of P-SCH sequences and S-SCH sequences correspond to cell IDs.

The PBCH is located in first through fourth symbols of a second half slot (slot #1) in the sub-frame #0, while the E-PBCH is located in fifth through seventh symbols. The PBCH is a broadcast channel that is commonly defined in LTE (a standard of a former generation of LTE-A) and LTE-A. The E-PBCH is a broadcast channel that is not defined in LTE. The PBCH and the E-PBCH are adjacent to each other in the time direction in the frequency-time domain. The adjacent arrangement facilitates detection of both the PBCH and the E-PBCH. The PBCH and the E-PBCH may be set to the same frequency or may be set to different frequencies.

The broadcast information to be commonly referred to by the mobile station 300 which connects to the base station 100 and the mobile station 400 which connects to the relay station 200 (or another relay station) is transmitted on the PBCH. This broadcast information includes information indicating the bandwidth of the component carrier in which the PBCH is located. On the other hand, as described below, the broadcast information about relaying (relay information) that is referred to by the mobile station 400 which connects to the relay station 200 (or another relay station) may be transmitted on the PBCH or may be transmitted on the E-PBCH.

Also, in the downlink radio frame, a reference signal (RS) as a known pilot signal is transmitted using a part of the radio resources excluding the radio resources used by the channels described above. The relay stations 200, 200a, and 200b and the mobile stations 300 and 400 can measure the received power and the reception quality using the reference signal.

It is to be noted that the location of the E-PBCH illustrated in FIG. 5 is an example, and the E-PBCH may be located in other positions. Examples of possible locations of the E-PBCH are as follows: (1) the fourth and fifth symbols of the slot #0; (2) the fourth and fifth symbols of the slot #0 and the fifth through seventh symbols of the slot #1; (3) the seventh symbol of the slot #1; (4) the fourth symbol of the slot #0; and (5) the sixth symbol of the slot #1. Further, the PBCH and the E-PBCH may be adjacent to each other in the frequency direction in the frequency-time domain.

Figure 6:
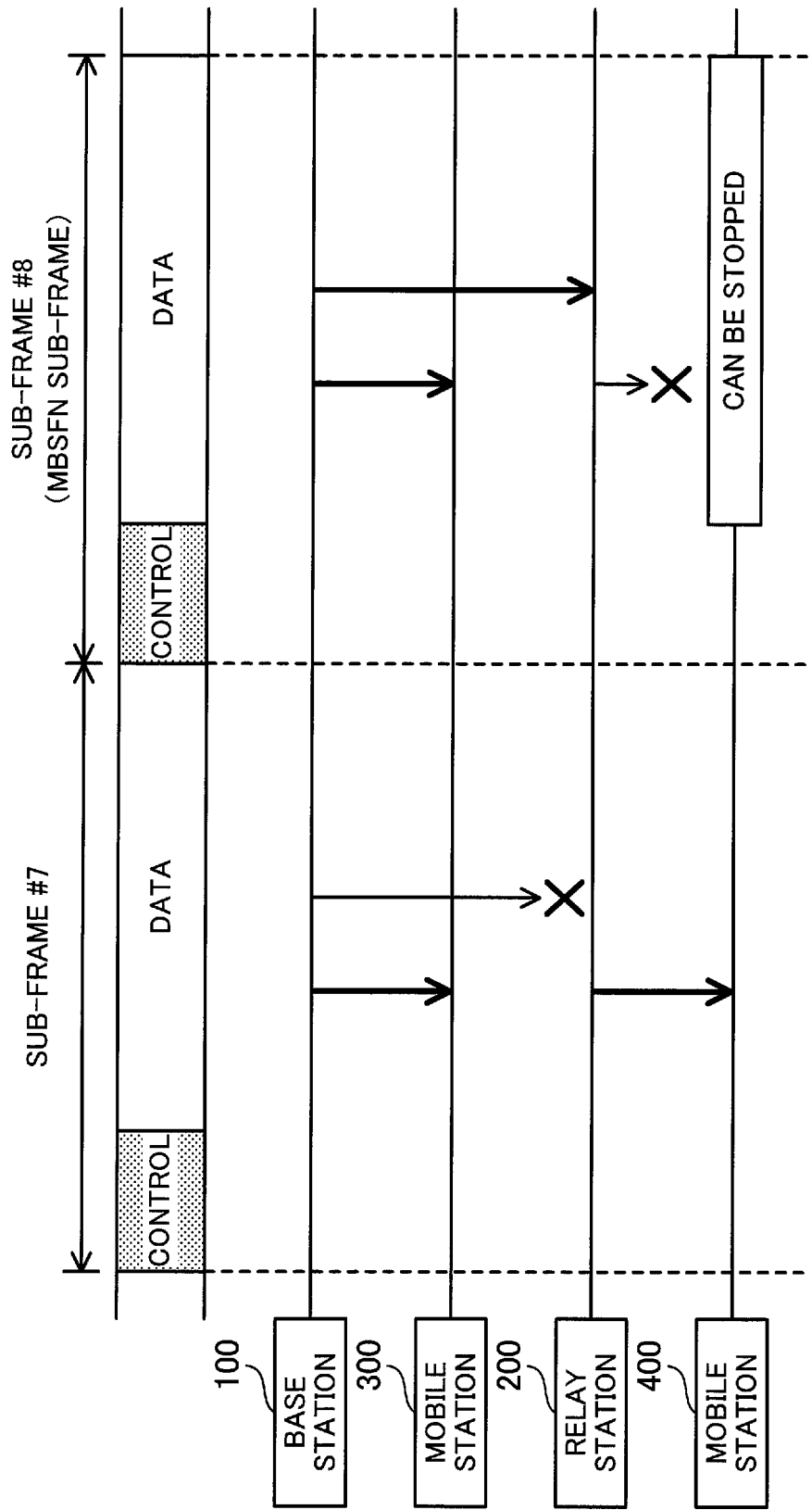
FIG. 6 illustrates an example of transmission and reception timings of a relay station.

FIG. 6 illustrates an example of transmission and reception timings of the relay station 200. In order to prevent radio interference, in the downlink, the relay station 200 performs a control operation such that reception from the base station 100 and transmission to the mobile station 400 are not performed at the same time. That is, reception from the base station 100 is stopped while transmission to the mobile station 400 is being processed. This is because, if otherwise, a transmission signal to the mobile station 400 might be input to a circuit for reception from the base station 100, resulting in a reduced reception quality. Similarly, in the uplink, the relay station 200 performs a control operation such that reception from the mobile station 400 and transmission to the base station 100 are not performed at the same time.

The timing at which communication between the relay station 200 and the mobile station 400 is not performed (the timing at which communication between the base station 100 and the relay station 200 is performed) is determined in advance by the base station 100 or the relay station 200. The timing in the uplink and the timing in the downlink may be set in connection with each other or independently from each other. In the downlink, the timing at which the relay station 200 does not perform transmission to the mobile station 400 may be set as the timing at which the base station 100 performs multimedia broadcast and multicast service single frequency network (MBSFN) transmission, for example.

MBSFN transmission is a form of communication in which a plurality of base stations transmits the same data at the same timing and at the same frequency. Normal cyclic prefixes are used for normal sub-frames, while extended cyclic prefixes are used for sub-frames (MBSFN sub-frame) in which MBSFN transmission is performed. MBSFN transmission is performed in the frames in which none of the synchronization channels (P-SCH, S-SCH), the broadcast channels (PBCH, E-PBCH), and the paging channel (PCH) is located. That is, MBSFN transmission is performed in one or more of the sub-frames #1 through #3 and #6 through #8.

In this example, the sub-frame #7 is a normal sub-frame, and the sub-frame #8 is an MBSFN sub-frame. In the sub-frame #7, the base station 100 is able to transmit data to its subordinate mobile station 300. Also, the relay station 200 is able to transmit data to its subordinate mobile station 400. The relay station 200, however, does not receive data from the base station 100. On the other hand, in the sub-frame #8, the base station 100 is able to transmit data to the relay station 200 and its subordinate mobile station 300. The relay station 200, however, does not transmit data to the mobile station 400.

Accordingly, if the mobile station 400 detects that the sub-frame #8 is a sub-frame in which the relay station 200 does not transmit data, the mobile station 400 is able to stop reception processing in the section in which the data in the sub-frame #8 are transmitted. Although the timing in the downlink is illustrated in FIG. 6, the timing in the uplink may be controlled in the same manner. Further, the relay stations 200a and 200b perform control operations similar to that performed by the relay station 200.

It is to be noted that the above-described timing control is designed for the case where the frequency band (or the radio resource) used for communication between the base station 100 and the relay station 200 and the frequency band (or the radio resource) used for communication between the relay station 200 and the mobile station 400 overlap each other. That is, a transmission stop interval is provided in order to prevent radio interference due to overlapping of frequency bands. On the other hand, in the case where the frequency band used for communication between the base station 100 and the relay station 200 and the frequency band used for communication between the relay station 200 and the mobile station 400 do not overlap each other, a transmission stop interval may not need to be provided.

Figure 7:
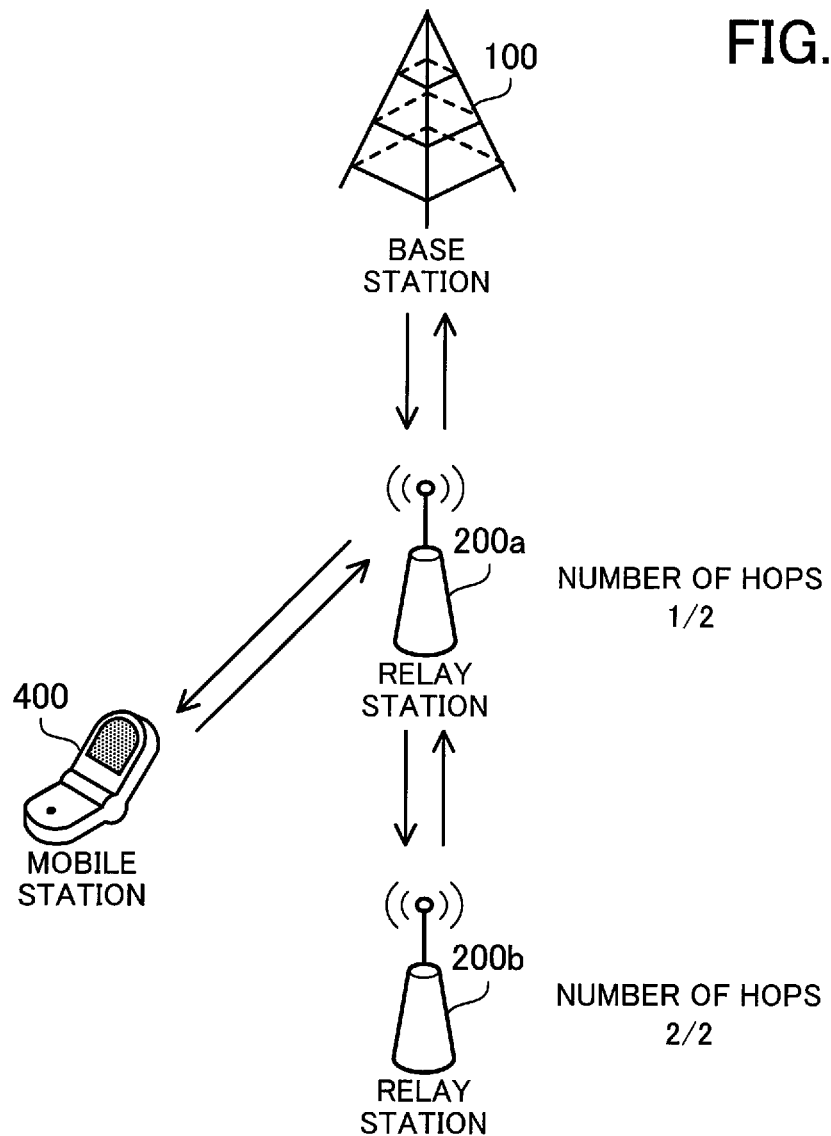
FIG. 7 illustrates an exemplary relay route between a base station and a mobile station.

FIG. 7 illustrates an exemplary relay route between the base station 100 and the mobile station 400. The base station 100 and the mobile station 400 may also communicate with each other via a plurality of relay stations. As illustrated in FIG. 7, the relay station 200a relays radio communication between the base station 100 and the relay station 200b. Also, in the case where the mobile station 400 is connected to the relay station 200a, the relay station 200a relays radio communication between the base station 100 and the mobile station 400. In the case where the mobile station 400 is connected to the relay station 200b, the relay station 200b relays radio communication between the relay station 200a and the mobile station 400. Although two relay stations are connected in series to each other in FIG. 7, three or more relay stations may be connected in series to one another.

The number of hops between the base station 100 and the mobile station 400 is defined. The number of hops may be defined as the number of relay stations via which communication is performed, for example. In this case, if the mobile station 400 connects to the relay station 200a, the number of hops is one. If the mobile station 400 connects to the relay station 200b, communication is performed via the relay stations 200a and 200b. Thus, the number of hops is two. Alternatively, the number of radio links through which communication is performed may be defined as the number of hops. In this case, if the mobile station 400 connects to the relay station 200a, the number of hops is two. If the mobile station 400 connects to the relay station 200b, the number of hops is three.

In addition to the number of hops for the mobile station 400 in a specific path, the total number of hops in the longest communication path extending via the plurality of relay stations that are connected in series to one another may be defined. The total number of hops in the longest communication path is the number of hops in the case where the mobile station 400 connects to the relay station (e.g., the relay station 200b) furthest from the base station 100. The number of relay stations is counted up from the base station 100 toward the relay station located at the end, for example. Thus, the determined total number of hops in the longest communication path is reported from the relay station at the end toward the base station 100 such that the each relay station recognizes the total number of hops in the longest communication path.

Figure 8:
FIG. 8 illustrates an example of relay information broadcasted by the relay station.

FIG. 8 illustrates an example of relay information broadcasted by the relay station 200. The relay station 200 broadcasts the relay information illustrated in FIG. 8 so as to allow the mobile station 400 to appropriately control the communication performed via the relay station 200. The relay information includes information about use by the RS (Relay Station), the RS timing, the RS transmission power, and the number of hops. The relay station 200 may broadcast one or more types of information out of these four types of information. Similarly, the relay stations 200a and 200b broadcast relay information.

The information about use by the RS is information (e.g., a flag) indicating that the component carrier in which the broadcast information is broadcasted is a component carrier used by the relay station 200. By referring to the information about use by the RS, the mobile station 400 recognizes that the station with which the mobile station 400 is communicating is a relay station, and that the component carrier is one used by the relay station.

The RS timing information indicates the communication timing between the relay station 200 and its subordinate mobile station. By referring to the RS timing information, the mobile station 400 is able to intermittently stop the radio signal processing (e.g., reception of a radio signal from the relay station 200). The RS timing information may include information indicating the uplink timing and the downlink timing.

This RS timing information may indicate the communication timing between the base station 100 and the relay station 200, or may indicate the communication timing between the relay station 200 and the mobile station 400. Further, the RS timing information may indicate the timing at which communication is performed, or may indicate the timing at which communication is not performed. Regardless of the form in which the RS timing information is represented, the mobile station 400 is able to determine the timing at which the radio signal processing can be stopped. The timing may be represented in an arbitrary way, such as the sub-frame number of the sub-frame that is not used for data transmission (or that is used for data transmission), a group of sub-frame numbers, the number of continuous sub-frames following the top sub-frame number.

The RS transmission power information indicates the transmission power of the reference signal as a pilot signal transmitted by the relay station 200. By referring to the RS transmission power information, the mobile station 400 is able to calculate a propagation loss on the basis of the received power. Then, the mobile station 400 is able to appropriately perform cell selection and transmission power control using the calculated propagation loss.

That is, the mobile station 400 measures the received power of the reference signal, and calculates a propagation loss on the basis of the transmission power of the reference signal transmitted by the transmission source and the measured received power. If the transmission power is constant regardless of the transmission source and the transmission power is known, the mobile station 400 can easily calculate the propagation loss. However, the base station 100 and the relay station 200 may have different cell radiuses, and thus have different powers for transmitting a reference signal. Therefore, the relay station 200 broadcasts information indicating the transmission power. The mobile station 400 having received the transmission power information is able to easily calculate a propagation loss.

Further, the mobile station 400 measures the received powers of the reference signal received by neighboring cells, and selects a cell to be accessed on the basis of the received power level. However, the transmission power of the relay station 200 may be smaller than the transmission power of the base station 100. Therefore, in the case where a method of simply comparing the received power levels is used, even if the mobile station 400 is located close to the relay station 200, the cell of the base station 100 might be selected. To avoid this problem, when comparing the received power levels, the mobile station 400 compensates (increases) the received power level of the relay station 200 in accordance with the calculated propagation loss. This allows effective use of the relay station 200, and thus improves the throughput.

Further, the mobile station 400 is able to control the transmission power from the mobile station 400 to the relay station 200 using the calculated propagation loss. Also, since the mobile station 400 reports the calculated loss to the relay station 200, the relay station 200 is able to control the transmission power from the relay station 200 to the mobile station 400. The mobile station may transmit a transmission power control (TPC) command in accordance with the propagation loss, in place of reporting the propagation loss.

The information about the number of hops indicates the number of relays in a communication path extending via the relay station 200. The information about the number of hops includes information about the number of hops for the mobile station 400 and information about the total number of hops in the longest communication path extending via the relay station 200. Referring to the information of the number of hops, the mobile station 400 is able to appropriately control transmission delay between the base station 100 and the mobile station 400.

That is, in the mobile communication system, the maximum transmission delay time may be set in accordance with the demanded Quality of Service (QoS). For example, in the case of real-time communication such as voice communication, the maximum transmission delay time may be set to be short. However, the greater the number of hops between the base station 100 and the mobile station 400 is, the greater the transmission delay between the base station 100 and the mobile station 400 is. In particular, in the case where communication is performed via a relay station employing a relay system that demodulates and decodes data, and transfers the data after coding and modulating the data again, the transmission delay is significantly increased.

Therefore, the mobile station 400 performs transmission delay control in accordance with the number of hops. For example, the maximum transmission delay time corresponding to the number of hops may be set. That is, the greater the number of hops is, the more relaxed the requirements on the maximum transmission delay time may be. Further, as for real-time communication, the number of hops may be restricted. In other words, cell selection may be performed such that the number of hops is reduced. Also, the substantial maximum transmission delay time may be calculated by subtracting the transmission delay time corresponding to the number of hops from the maximum transmission delay time corresponding to the QoS. Thus, the mobile station 400 is able to perform transmission delay control so as to satisfy the requirements on the substantial maximum transmission delay time.

In the following, a description will be given of the case where the base station 100 communicates with the mobile station 400 via the relay station 200.

Figure 9:
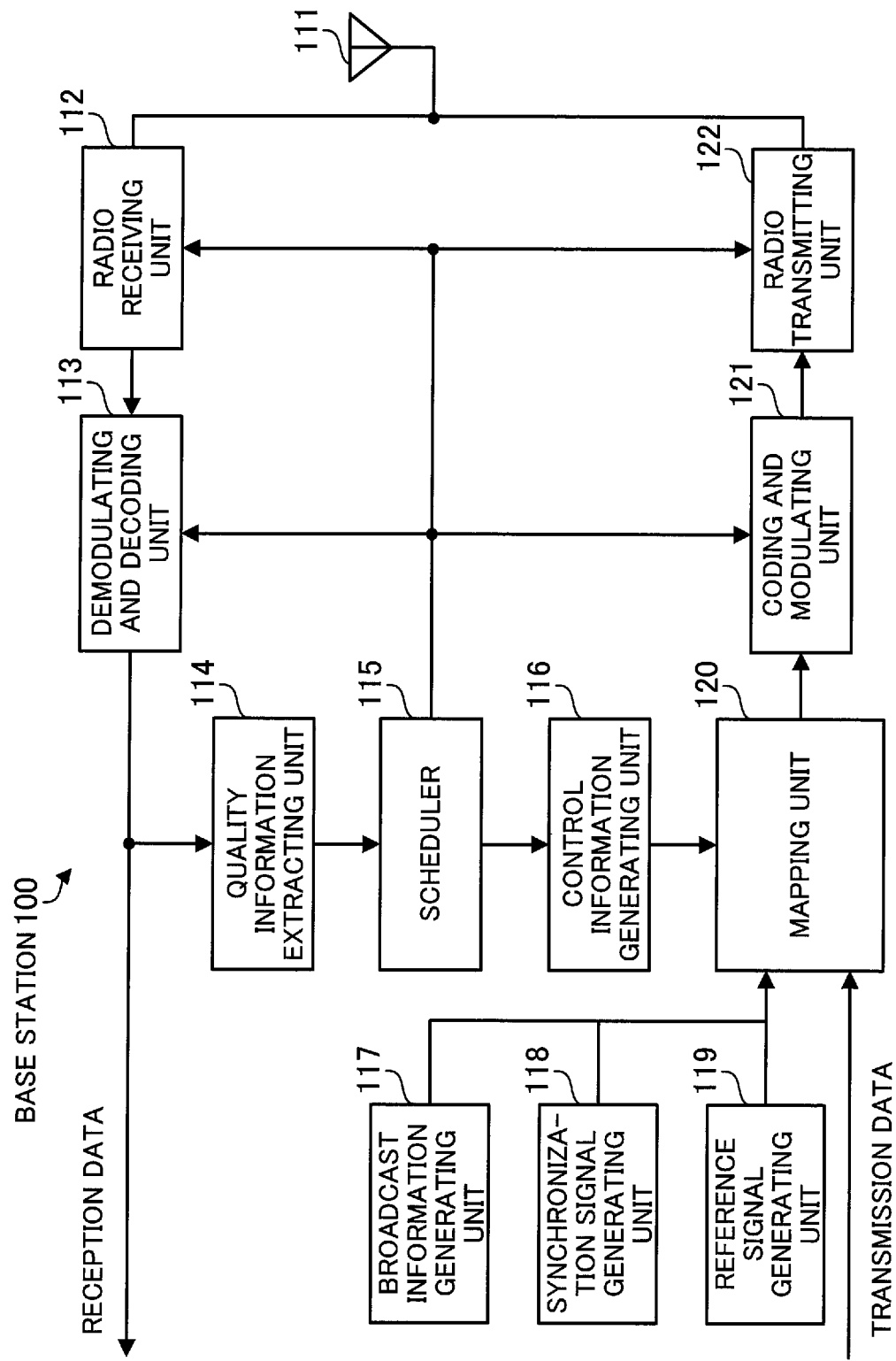
FIG. 9 is a block diagram of the base station.

FIG. 9 is a block diagram of the base station 100. The base station 100 includes an antenna 111, a radio receiving unit 112, a demodulating and decoding unit 113, a quality information extracting unit 114, a scheduler 115, a control information generating unit 116, a broadcast information generating unit 117, a synchronization signal generating unit 118, a reference signal generating unit 119, a mapping unit 120, a coding and modulating unit 121, and a radio transmitting unit 122.

The antenna 111 receives a radio signal transmitted by the relay station 200, and outputs the received radio signal to the radio receiving unit 112. Also, the antenna 111 wirelessly outputs a transmission signal obtained from the radio transmitting unit 122. It is to be noted that a transmitting antenna and a receiving antenna may be separately provided in the base station 100 in place of a transmitting and receiving antenna. Alternatively, a plurality of transmitting and receiving antennas may be used so as to perform diversity transmission.

The radio receiving unit 112 performs radio signal processing on the signal obtained from the antenna 111 so as to convert (down-convert) the high-frequency radio signal into a low-frequency baseband signal. The radio receiving unit 112 includes, for example, a low noise amplifier (LNA), a frequency converter, a band pass filter (BPF), and an analog-to-digital (A/D) converter, in order to perform radio signal processing.

The demodulating and decoding unit 113 performs demodulation and error-correction decoding on the baseband signal obtained from the radio receiving unit 112 so as to obtain user data and control information. Then, the demodulating and decoding unit 113 outputs the obtained user data and control information. The demodulation and decoding are performed using a scheme corresponding to a predetermined modulation and coding scheme (MCS) or a modulation and coding scheme specified by the scheduler 115. Examples of modulation schemes include digital modulation schemes such as Quadrature Phase Shift Keying (QPSK) and Quadrature Amplitude Modulation (16QAM). Examples of coding schemes include turbo codes and low density parity check (LDPC) codes. The extracted user data are converted into the form of packets, and are transferred to the upper network.

The quality information extracting unit 114 extracts a measurement report on the radio quality which has been transmitted as control information by the relay station 200. Then, the quality information extracting unit 114 outputs the extracted measurement report to the scheduler 115.

The scheduler 115 allocates radio resources to be used for communication with the relay station 200, on the basis of the measurement report obtained from the quality information extracting unit 114. Then, the scheduler 115 reports the allocation status of the radio resources to the radio receiving unit 112, the demodulating and decoding unit 113, the control information generating unit 116, the coding and modulating unit 121, and the radio transmitting unit 122. Also, the scheduler 115 adaptively selects a modulation and coding scheme on the basis of the measurement report. Then, the scheduler 115 reports the selected modulation and coding scheme to the demodulating and decoding unit 113, the control information generating unit 116, and the coding and modulating unit 121.

The control information generating unit 116 generates L1/L2 control information to be transmitted to the relay station 200, on the basis of the report from the scheduler 115. This control information is transmitted on a relay-physical downlink control channel (R-PDCCH), which is a downlink control channel established between the base station 100 and the relay station 200. The control information includes information indicating the allocation results of the radio resources and the modulation and coding scheme to be applied.

The broadcast information generating unit 117 generates broadcast information to be transmitted on the PBCH. More specifically, the broadcast information generating unit 117 generates broadcast information to be commonly referred to by the relay station 200 and the mobile stations 300 and 400 for controlling communication. Also, the broadcast information generating unit 117 generates information to be used by the relay station 200 for generating relay information. For example, in the case where the base station specifies the communication timing between the base station 100 and the relay station 200, the broadcast information generating unit 117 generates information indicating the communication timing.

The synchronization signal generating unit 118 generates a P-SCH sequence and an S-SCH sequence corresponding to the cell ID assigned to the cell of the base station 100. The reference signal generating unit 119 generates a reference signal as a known signal.

The mapping unit 120 maps to a downlink radio frame the user data to the mobile station 400 that have been received from the upper network, and the control information and control signals generated by the control information generating unit 116, the broadcast information generating unit 117, the synchronization signal generating unit 118, and the reference signal generating unit 119. Then, the mapping unit 120 sequentially outputs the mapped data to the coding and modulating unit 121. The user data to the mobile station 400 are transmitted on a relay-physical downlink shared channel (R-PDSCH), which is a downlink data channel established between the base station 100 and the relay station 200.

The coding and modulating unit 121 performs error-correction coding and modulation on the data obtained from the mapping unit 120 so as to generate a baseband signal as a transmission signal. Then, the coding and modulating unit 121 outputs the generated baseband signal to the radio transmitting unit 122. The coding and modulation are performed using a predetermined modulation and coding scheme or a modulation and coding scheme specified by the scheduler 115.

The radio transmitting unit 122 performs radio signal processing on the transmission signal obtained from the coding and modulating unit 121 so as to convert (up-convert) the low-frequency baseband signal into a high-frequency radio signal. The radio transmitting unit 122 includes, for example, a digital-to-analog (D/A) converter, a frequency converter, a band pass filter, and power amplifier, in order to perform radio signal processing.

Figure 10:
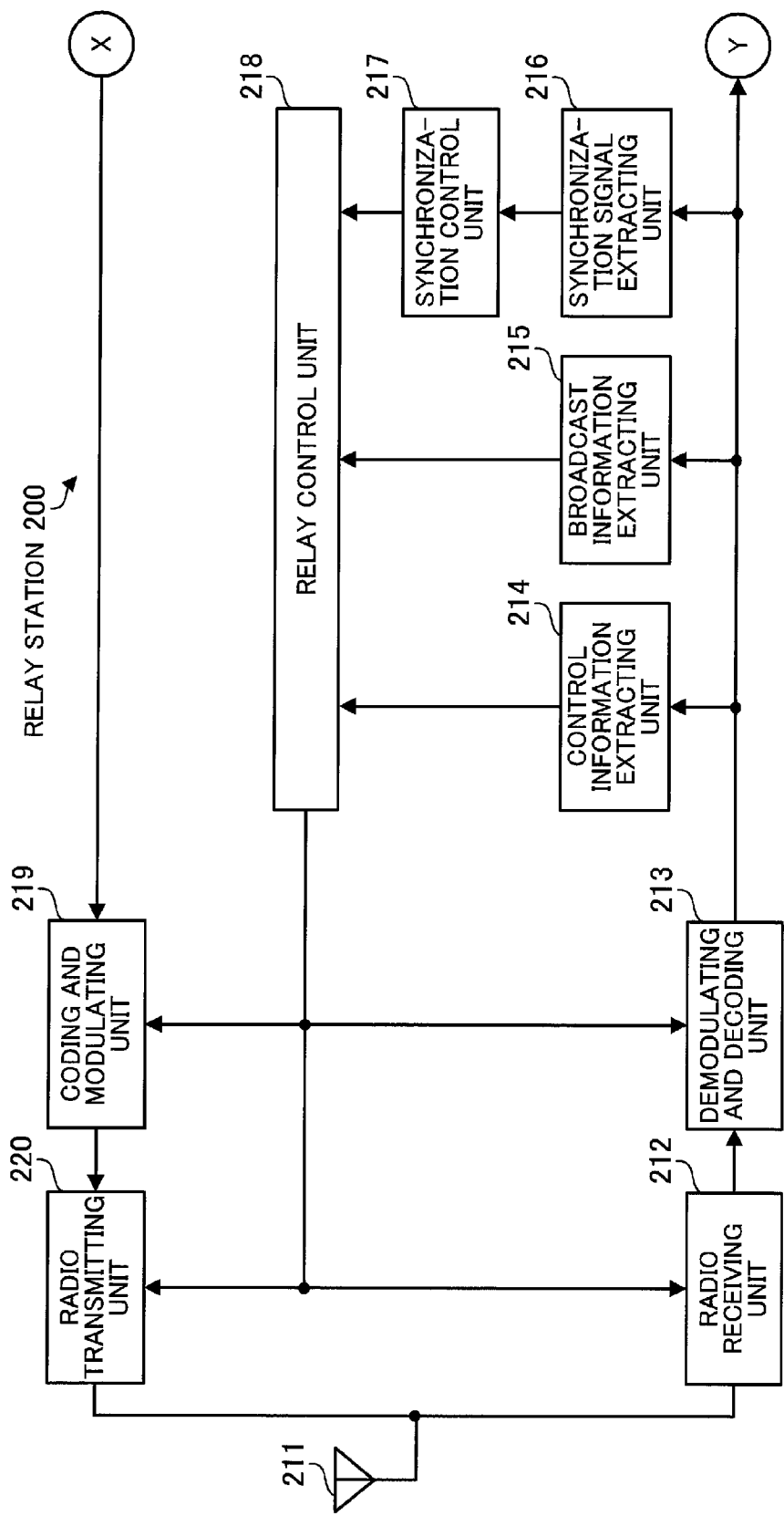
FIGS. 10 and 11 are block diagrams illustrating the relay station.

FIG. 10 is a block diagram of the relay station 200. The relay station 200 includes an antenna 211, a radio receiving unit 212, a demodulating and decoding unit 213, a control information extracting unit 214, a broadcast information extracting unit 215, a synchronization signal extracting unit 216, a synchronization control unit 217, a relay control unit 218, a coding and modulating unit 219, and a radio transmitting unit 220. In FIG. 10, units for communication with the base station 100 are illustrated.

The antenna 211 receives a radio signal transmitted by the base station 100, and outputs the received radio signal to the radio receiving unit 212. Also, the antenna 211 wirelessly outputs a transmission signal obtained from the radio transmitting unit 220. The radio receiving unit 212 performs radio signal processing on the signal obtained from the antenna 211 so as to down-convert the radio signal into a baseband signal. The demodulating and decoding unit 213 performs demodulation and error-correction decoding on the baseband signal obtained from the radio receiving unit 212 so as to obtain user data and control information. Then, the demodulating and decoding unit 213 outputs the obtained user data and control information.

The control information extracting unit 214 extracts L1/L2 control information transmitted on the R-PDCCH by the base station 100. As mentioned above, this control information includes information indicating the allocation results of the radio resources and the modulation and coding scheme to be applied. Then, the control information extracting unit 214 outputs the extracted control information to the relay control unit 218.

The broadcast information extracting unit 215 extracts broadcast information transmitted on the PBCH by the base station 100. As mentioned above, the broadcast information to be extracted includes information to be commonly referred to by the relay station 200 and the mobile stations 300 and 400 for controlling communication, and information to be used by the relay station 200 for generating relay information. Then, the broadcast information extracting unit 215 outputs the extracted broadcast information to the relay control unit 218.

The synchronization signal extracting unit 216 extracts synchronization signals (primary synchronization signal and secondary synchronization signal) transmitted on the P-SCH and S-SCH by the base station 100. Then, the synchronization signal extracting unit 216 outputs the synchronization signals to the synchronization control unit 217.

The synchronization control unit 217 detects a radio frame timing of 10 ms cycle and a slot timing of 0.5 ms cycle on the basis of the synchronization signals extracted by the synchronization signal extracting unit 216. Also, the synchronization control unit 217 identifies the P-SCH sequence and the S-SCH sequence used by the base station 100, and identifies a cell ID on the basis of the combination of the P-SCH sequence and the S-SCH sequence. Then, the synchronization control unit 217 reports the detected timings and identified cell ID to the relay control unit 218.

The relay control unit 218 controls operations of the radio receiving unit 212, the demodulating and decoding unit 213, the coding and modulating unit 219, and the radio transmitting unit 220 on the basis of the control information extracted by the control information extracting unit 214, the broadcast information extracted by the broadcast information extracting unit 215, and the timings detected by the synchronization control unit 217. Also, the relay control unit 218 determines which type of the broadcast information is to be transmitted to the subordinate mobile station, on the basis of the broadcast information extracted by the broadcast information extracting unit 215.

The coding and modulating unit 219 performs error-correction coding and modulation on the data obtained from the mobile station 400 so as to generate a baseband signal as a transmission signal. Then, the coding and modulating unit 219 outputs the generated baseband signal to the radio transmitting unit 220. The radio transmitting unit 220 performs radio signal processing on the transmission signal obtained from the coding and modulating unit 219 so as to up-convert the baseband signal into a radio signal.

Figure 11:
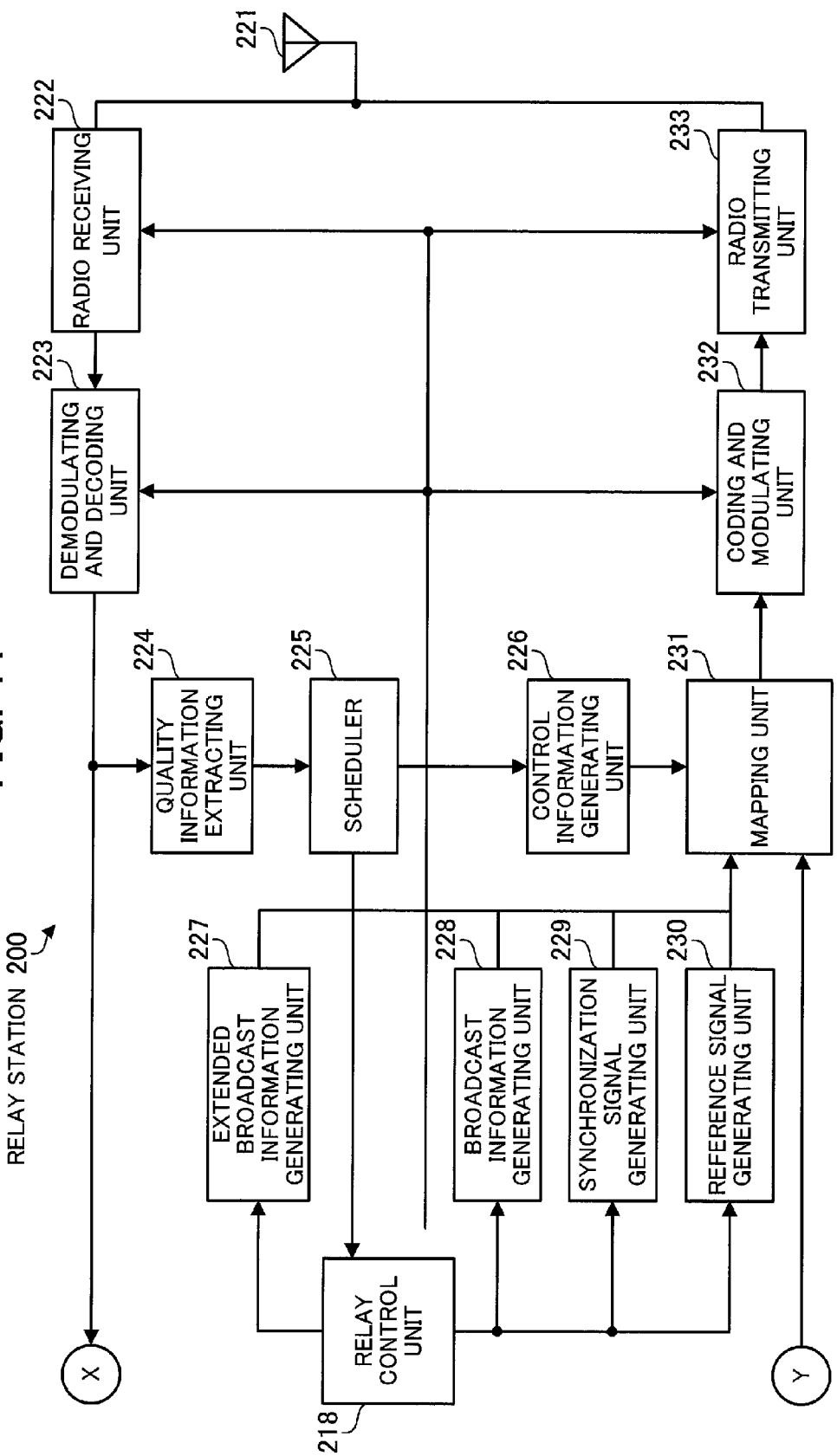

FIG. 11 is a block diagram (cont'd) of the relay station 200. The relay station 200 further includes an antenna 221, a radio receiving unit 222, a demodulating and decoding unit 223, a quality information extracting unit 224, a scheduler 225, a control information generating unit 226, an extended broadcast information generating unit 227, a broadcast information generating unit 228, a synchronization signal generating unit 229, a reference signal generating unit 230, a mapping unit 231, a coding and modulating unit 232, and a radio transmitting unit 233. In FIG. 11, units for communication with the mobile station 400 are illustrated.

The antenna 221 receives a radio signal transmitted by the mobile station 400, and outputs the received radio signal to the radio receiving unit 222. Also, the antenna 221 wirelessly outputs a transmission signal obtained from the radio transmitting unit 233. The radio receiving unit 222 performs radio signal processing on the signal obtained from the antenna 221 so as to down-convert the radio signal into a baseband signal. The demodulating and decoding unit 223 performs demodulation and error-correction decoding on the baseband signal obtained from the radio receiving unit 222 so as to obtain user data and control information. Then, the demodulating and decoding unit 223 outputs the obtained user data and control information.

The quality information extracting unit 224 extracts a measurement report on the radio quality which has been transmitted as control information by the mobile station 400. Then, the quality information extracting unit 224 outputs the extracted measurement report to the scheduler 225.

The scheduler 225 allocates radio resources to be used for communication with the mobile station 400 and adaptively selects a modulation and coding scheme, on the basis of the measurement report obtained from the quality information extracting unit 224. Then, the scheduler 225 reports the allocation status of the radio resources and the selected modulation and coding scheme to the relay control unit 218 and the control information generating unit 226. The allocation status of the radio resources and the selected modulation and coding scheme are reported from the relay control unit 218 to the radio receiving unit 222, the demodulating and decoding unit 223, the coding and modulating unit 232, and the radio transmitting unit 233.

The control information generating unit 226 generates L1/L2 control information to be transmitted to the mobile station 400, on the basis of the report from the scheduler 225. This control information is transmitted on a PDCCH established between the relay station 200 and the mobile station 400. The control information includes information indicating the allocation results of the radio resources and the modulation and coding scheme to be applied.

The extended broadcast information generating unit 227 generates extended broadcast information to be transmitted to the subordinate mobile station on the E-PBCH in accordance with an instruction from the relay control unit 218. The extended broadcast information includes the above-described relay information. The relay information is generated by referring to information (information to be used for generation of the relay information) transmitted on the PBCH by the base station 100. For example, the relay information may include RS timing information that indicates the communication timing specified by the base station 100, and may include other information that indicates contents determined by the relay station 200.

The broadcast information generating unit 228 generates broadcast information to be transmitted to the subordinate mobile station on the PBCH in accordance with an instruction from the relay control unit 218. More specifically, the broadcast information generating unit 228 generates broadcast information to be commonly referred to by the mobile stations 300 and 400 for controlling communication. This broadcast information is the same as that transmitted on the PBCH by the base station 100.

The synchronization signal generating unit 229 generates a P-SCH sequence and an S-SCH sequence corresponding to the cell ID assigned to the cell of the relay station 200. The reference signal generating unit 230 generates a reference signal as a known signal.

The mapping unit 231 maps to a downlink radio frame the user data to the mobile station 400 that have been received from the base station 100, and the control information and control signals generated by the control information generating unit 226, the extended broadcast information generating unit 227, the broadcast information generating unit 228, the synchronization signal generating unit 229, and the reference signal generating unit 230. Then, the mapping unit 231 sequentially outputs the mapped data to the coding and modulating unit 232. The user data to the mobile station 400 are transmitted on a PDSCH established between the relay station 200 and the mobile station 400.

The coding and modulating unit 232 performs error-correction coding and modulation on the data obtained from the mapping unit 231 so as to generate a baseband signal as a transmission signal. Then, the coding and modulating unit 232 outputs the generated baseband signal to the radio transmitting unit 233. The radio transmitting unit 233 performs radio signal processing on the transmission signal obtained from the coding and modulating unit 232 so as to up-convert the baseband signal into a radio signal.

Figure 12:
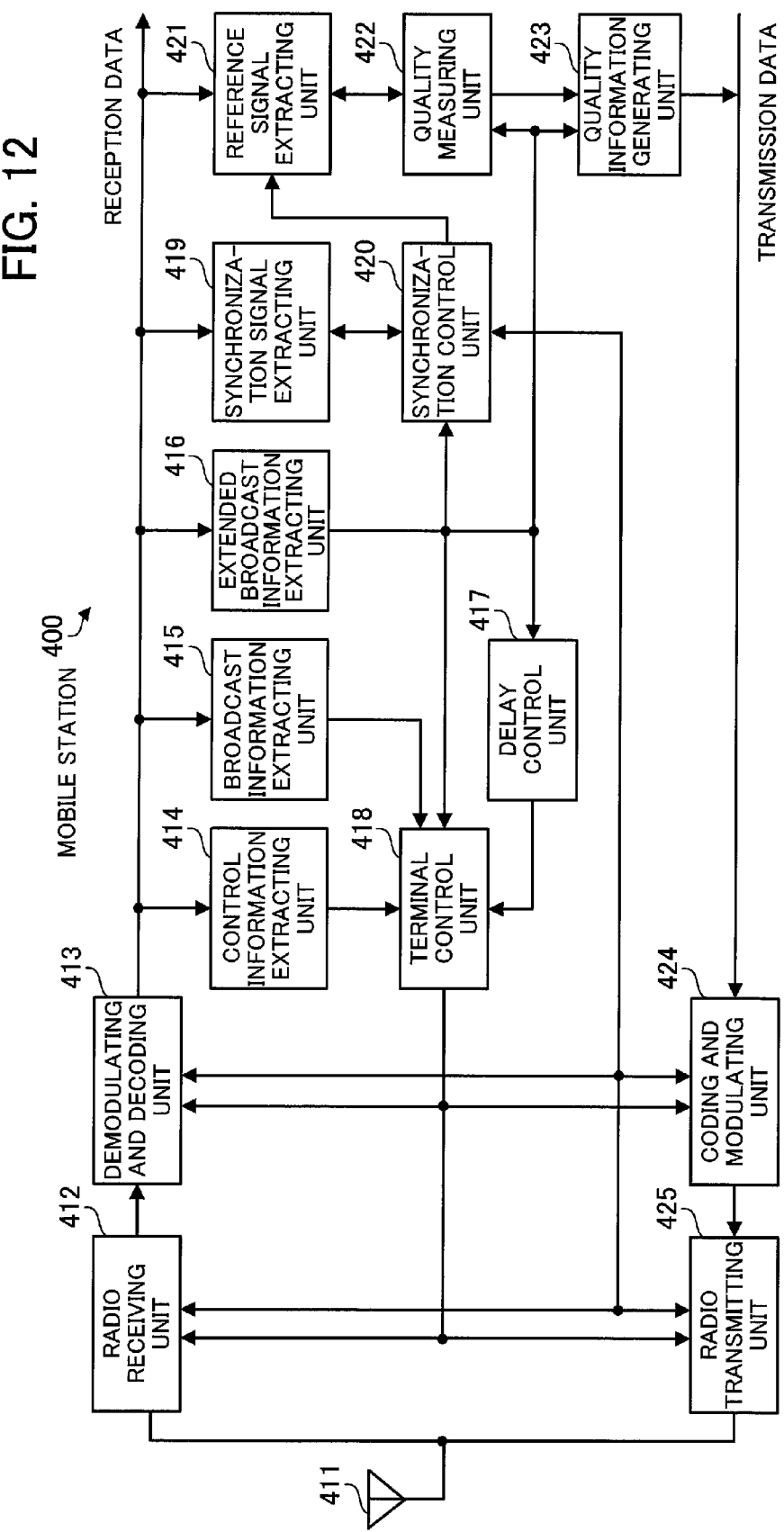
FIG. 12 is a block diagram of the mobile station.

FIG. 12 is a block diagram of the mobile station 400. The mobile station 400 includes an antenna 411, a radio receiving unit 412, a demodulating and decoding unit 413, a control information extracting unit 414, a broadcast information extracting unit 415, an extended broadcast information extracting unit 416, a delay control unit 417, a terminal control unit 418, a synchronization signal extracting unit 419, a synchronization control unit 420, a reference signal extracting unit 421, a quality measuring unit 422, a quality information generating unit 423, a coding and modulating unit 424, and a radio transmitting unit 425. The mobile station 300 may be implemented with the same configuration as that of the mobile station 400.

The antenna 411 receives a radio signal transmitted by the relay station 200, and outputs the received radio signal to the radio receiving unit 412. Also, the antenna 411 wirelessly outputs a transmission signal obtained from the radio transmitting unit 425. The radio receiving unit 412 performs radio signal processing on the signal obtained from the antenna 411 so as to down-convert the radio signal into a baseband signal. The demodulating and decoding unit 413 performs demodulation and error-correction decoding on the baseband signal obtained from the radio receiving unit 412 so as to obtain user data and control information. Then, the demodulating and decoding unit 413 outputs the obtained user data and control information.

The control information extracting unit 414 extracts L1/L2 control information transmitted on the PDCCH by the relay station 200. As mentioned above, this control information includes information indicating the allocation results of the radio resources and the modulation and coding scheme to be applied. Then, the control information extracting unit 414 outputs the extracted control information to the terminal control unit 418.

The broadcast information extracting unit 415 extracts broadcast information transmitted on the PBCH by the relay station 200. The broadcast information includes information indicating the bandwidth of the component carrier on which the broadcast information is transmitted. Then, the broadcast information extracting unit 415 outputs the extracted broadcast information to the terminal control unit 418.

The extended broadcast information extracting unit 416 extracts extended broadcast information transmitted on the E-PBCH by the relay station 200. As mentioned above, the extended broadcast information includes relay information, which includes information about use by the RS, the RS timing, the RS transmission power, and the number of hops. The extended broadcast information extracting unit 416 reports the information about use by the RS to the terminal control unit 418. Also, the extended broadcast information extracting unit 416 reports the RS timing to the terminal control unit 418, the synchronization control unit 420, the quality measuring unit 422, and the quality information generating unit 423. The extended broadcast information extracting unit 416 reports the RS transmission power to at least one of the quality measuring unit 422 and the quality information generating unit 423. The extended broadcast information extracting unit 416 reports the number of hops to the delay control unit 417.

The delay control unit 417 controls transmission delay between the base station 100 and the mobile station 400 on the basis of the number of hops reported from the extended broadcast information extracting unit 416. For example, the delay control unit 417 sets the maximum transmission delay time corresponding to the number of hops, and determines whether the current communication path satisfies the requirements on the maximum transmission delay time. Then, the delay control unit 417 reports the results of the transmission delay control to the terminal control unit 418.

The terminal control unit 418 obtains the control information extracted by the control information extracting unit 414, the broadcast information extracted by the broadcast information extracting unit 415, the report from the extended broadcast information extracting unit 416, and the report from the delay control unit 417. Then, the terminal control unit 418 controls operations of the radio receiving unit 412, the demodulating and decoding unit 413, the coding and modulating unit 424, and the radio transmitting unit 425 on the basis of the obtained information. In particular, the terminal control unit 418 intermittently stops reception processing of the radio receiving unit 412 and the demodulating and decoding unit 413 on the basis of the RS timing included in the extended broadcast information. The reception processing may be stopped by stopping power supply, stopping clock supply, or reducing the clock frequency, for example.

The synchronization signal extracting unit 419 extracts synchronization signals (primary synchronization signal and secondary synchronization signal) transmitted on the P-SCH and S-SCH by the relay station 200. Then, the synchronization signal extracting unit 419 outputs the synchronization signals to the synchronization control unit 420.

The synchronization control unit 420 detects a radio frame timing of 10 ms cycle and a slot timing of 0.5 ms cycle on the basis of the synchronization signals extracted by the synchronization signal extracting unit 419. Then, the synchronization control unit 420 reports the detected timings to the reference signal extracting unit 421, and also feeds back the detected timings to the synchronization signal extracting unit 419. Also, the synchronization control unit 420 identifies the P-SCH sequence and the S-SCH sequence used by the relay station 200, and identifies a cell ID on the basis of the combination of the P-SCH sequence and the S-SCH sequence.

The reference signal extracting unit 421 extracts a reference signal transmitted by the relay station 200 in accordance with the timings of the radio frame and slot detected by the synchronization control unit 420. Then, the reference signal extracting unit 421 outputs the extracted reference signal to the quality measuring unit 422.

The quality measuring unit 422 measures the reception quality of the component carrier used by the relay station 200, by using the reference signal extracted by the reference signal extracting unit 421. Then, the quality measuring unit 422 reports the measurement results to the quality information generating unit 423, and also feeds back the measurement results to the reference signal extracting unit 421. The quality information generating unit 423 generates control information (measurement report) indicating the reception quality measured by the quality measuring unit 422. Example of measurement reports include a channel quality indication (CQI) that represents the reception quality as a discrete value. It is to be noted that the quality measuring unit 422 or the quality information generating unit 423 corrects the value indicating the measured reception quality in accordance with the transmission power of the relay station 200.

The coding and modulating unit 424 performs error-correction coding and modulation on the user data to be transmitted to the relay station 200 so as to generate a baseband signal as a transmission signal. Then, the coding and modulating unit 424 outputs the generated baseband signal to the radio transmitting unit 425. The radio transmitting unit 425 performs radio signal processing on the transmission signal obtained from the coding and modulating unit 424 so as to up-convert the baseband signal into a radio signal.

Figure 13:
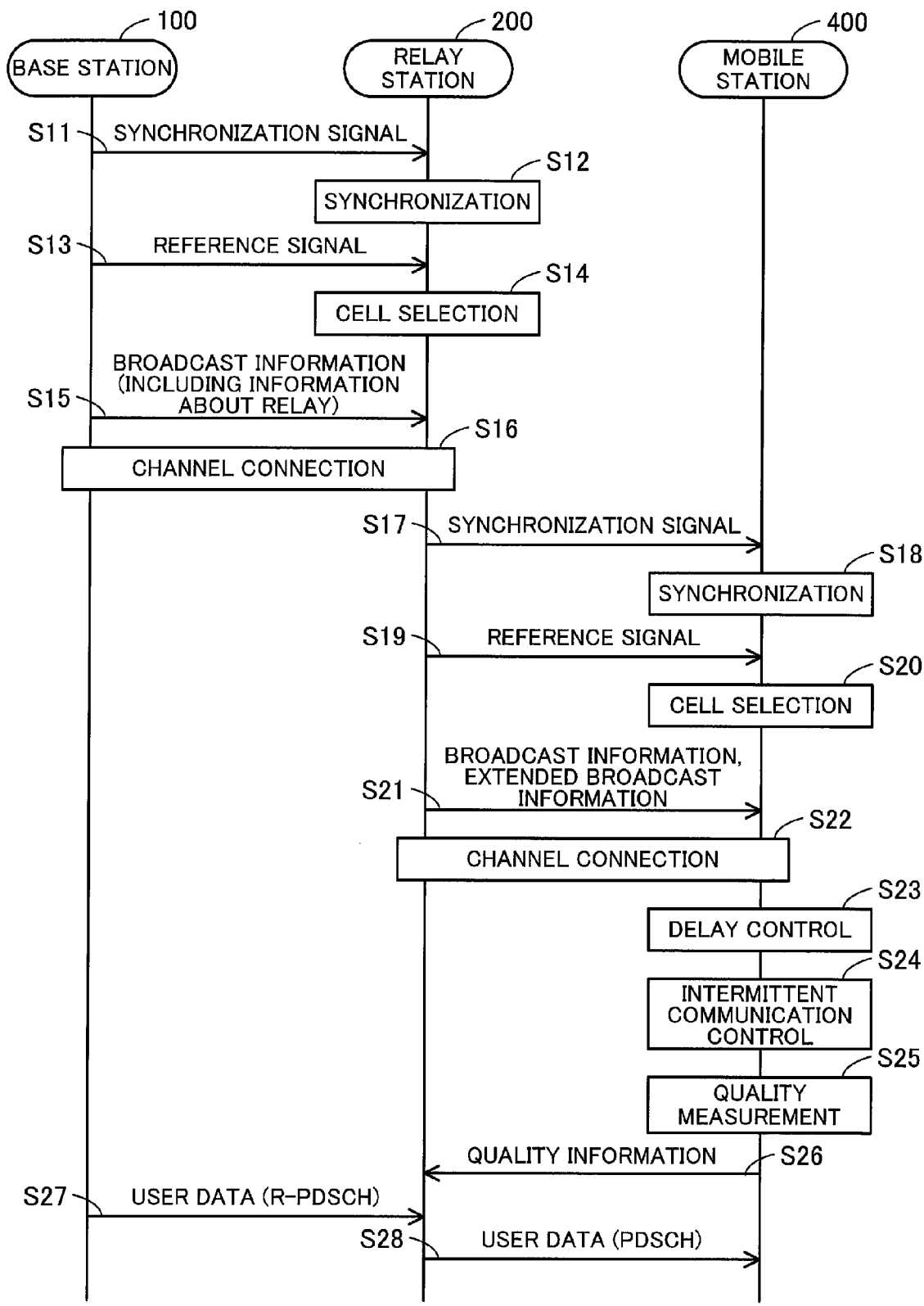
FIG. 13 is a sequence diagram illustrating a first example of communication via the relay station.

FIG. 13 is a sequence diagram illustrating a first example of communication via the relay station 200. The operations illustrated in FIG. 13 will be described in order of increasing step number.

(Step S11) The base station 100 transmits synchronization signals (primary synchronization signal and secondary synchronization signal) corresponding to the cell ID of the cell managed by the base station 100 on the P-SCH and S-SCH. The relay station 200 receives the synchronization signals from the base station 100.

(Step S12) The relay station 200 detects a radio frame timing and a slot timing on the basis of the received synchronization signals so as to achieve synchronization with the base station 100.

(Step S13) The base station 100 transmits a reference signal as a known signal. The relay station 200 receives the reference signal from the base station 100.

(Step S14) The relay station 200 measures a received power on the basis of the received reference signal. Similarly, in the case where other base stations and relay stations are present, the relay station 200 measures the reception qualities of these candidate connection destinations. Then, the relay station 200 selects a cell to be accessed (i.e., a base station or another relay station to which the mobile station 400 is to connect). In this example, it is assumed that the base station 100 is selected.

(Step S15) The base station 100 transmits broadcast information on the PBCH. This broadcast information includes information indicating the bandwidth of the component carrier. The broadcast information also includes information (e.g., RS timing information) to be used for generation of relay information to be broadcasted by the relay station 200. The relay station 200 receives the broadcast information from the base station 100.

(Step S16) The relay station 200 refers to the received broadcast information, and performs processing of channel connection to the base station 100. It is to be noted that the operations in Steps S11 through S16 may be omitted if a channel is already established between the base station 100 and the relay station 200.

(Step S17) The relay station 200 transmits synchronization signals (primary synchronization signal and secondary synchronization signal) corresponding to the cell ID of the cell managed by the relay station 200 on the P-SCH and S-SCH. The mobile station 400 receives the synchronization signals from the relay station 200.

(Step S18) The mobile station 400 detects a radio frame timing and a slot timing on the basis of the received synchronization signals so as to achieve synchronization with the relay station 200.

(Step S19) The relay station 200 transmits a reference signal as a known signal. The mobile station 400 receives the reference signal from the relay station 200.

(Step S20) The mobile station 400 measures a received power on the basis of the received reference signal. Similarly, the mobile station 400 measures a received power for the base station 100 and other relay stations. Then, the mobile station 400 selects a cell to be accessed (i.e., a base station or another relay station to which the mobile station 400 is to connect). In this example, it is assumed that the relay station 200 is selected.

(Step S21) The relay station 200 generates broadcast information thereof using the broadcast information received in Step S15, and transmits the generated broadcast information on the PBCH. Similarly to the broadcast information of the base station 100, this broadcast information includes information indicating the bandwidth of the component carrier. Further, the relay station 200 generates relay information using the received broadcast information, and transmits the generated relay information as extended broadcast information on the E-PBCH. As mentioned above, the relay information includes information about use by the RS, the RS timing, the RS transmission power, and the number of hops. The mobile station 400 receives the broadcast information and the extended broadcast information from the relay station 200.

It is likely that the base station 100 updates information (e.g., RS timing information) to be used for generation of relay information after a channel is established between the base station 100 and the relay station 200. Therefore, the base station 100 may broadcast the information every time an update is made, or may regularly broadcast the information. The relay station 200 generates relay information on the basis of the latest broadcast information received from the base station 100.

(Step S22) The mobile station 400 refers to the received broadcast information, and performs processing of channel connection to the relay station 200.

(Step S23) The mobile station 400 controls transmission delay between the base station 100 and the mobile station 400 on the basis of the information about the number of hops included in the extended broadcast information.

(Step S24) The mobile station 400 controls intermittent stopping of reception processing on the basis of the RS timing information included in the extended broadcast information.

(Step S25) The mobile station 400 measures the radio quality of the relay station 200 by referring to the RS transmission power information included in the extended broadcast information. It is to be noted that the operations in Steps S23 through S25 may be executed in an arbitrary order.

(Step S26) The mobile station 400 feeds back quality information indicating the radio quality measured in Step S25 to the relay station 200.

(Step S27) When the base station 100 receives user data to the mobile station 400 from the upper network, the base station 100 transmits the user data on the R-PDSCH to the relay station 200. Also, the base station 100 transmits control information associated with transmission of the user data on the R-PDCCH to the relay station 200. The relay station 200 receives the user data to the mobile station 400 from the base station 100.

(Step S28) The relay station 200 transfers the received user data on the PDSCH to the mobile station 400. Upon transmitting the user data, the relay station 200 demodulates and decodes the user data, and codes and modulates the user data again. Also, the relay station 200 transmits control information associated with transmission of the user data on the PDCCH to the mobile station 400.

It is to be noted that although the mobile station 400 receives both the broadcast information and the extended broadcast information from the relay station 200 in the exemplary sequence illustrated in FIG. 13, the mobile station 400 may receive broadcast information from the base station 100.

Figure 14:
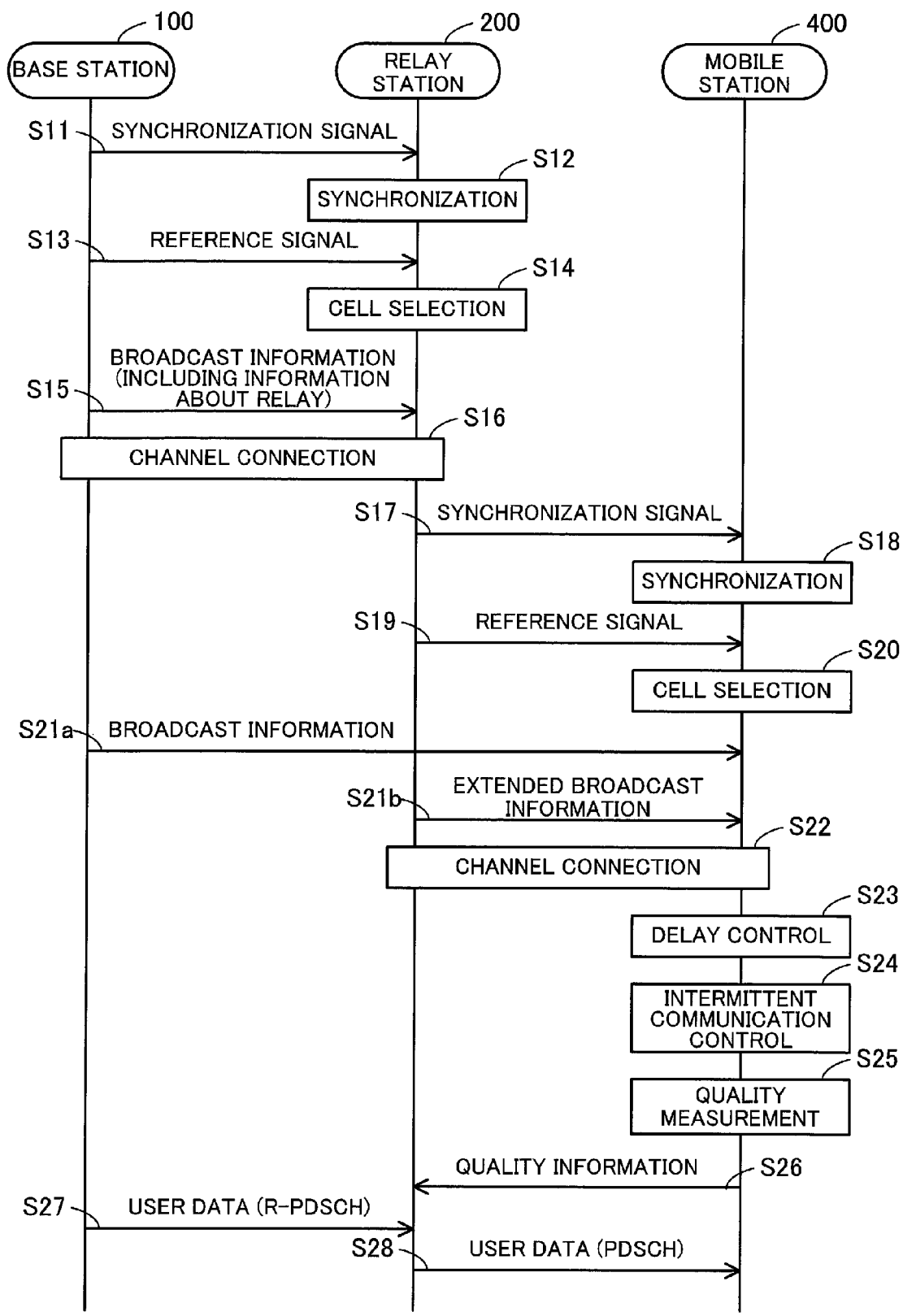
FIG. 14 is a sequence diagram illustrating a second example of communication via the relay station.

FIG. 14 is a sequence diagram illustrating a second example of communication via the relay station 200. In the exemplary sequence illustrated in FIG. 14, Steps S21a and S21b are executed in place of Step S21 of FIG. 13.

(Step S21a) The base station 100 transmits broadcast information on the PBCH. This broadcast information includes information indicating the bandwidth of the component carrier. The mobile station 400 receives the broadcast information from the base station 100.

(Step S21b) The relay station 200 generates relay information using the broadcast information received in Step S15, and transmits the generated relay information as extended broadcast information on the E-PBCH. The mobile station 400 receives the extended broadcast information from the relay station 200.

In this way, in the case where the mobile station 400 receives a radio signal from the base station 100, the mobile station 400 may receive broadcast information transmitted from the base station 100 so as to use the received broadcast information to perform communication control. The broadcast information from the base station 100 and the extended broadcast information from the relay station 200 may be received in the same frame, or may be received in different frames.

Next, a description will be given of variations of a method of reporting information to be used for generation of relay information from the base station 100 to the relay station 200 and a method of broadcasting relay information of the relay station 200.

Figure 15:
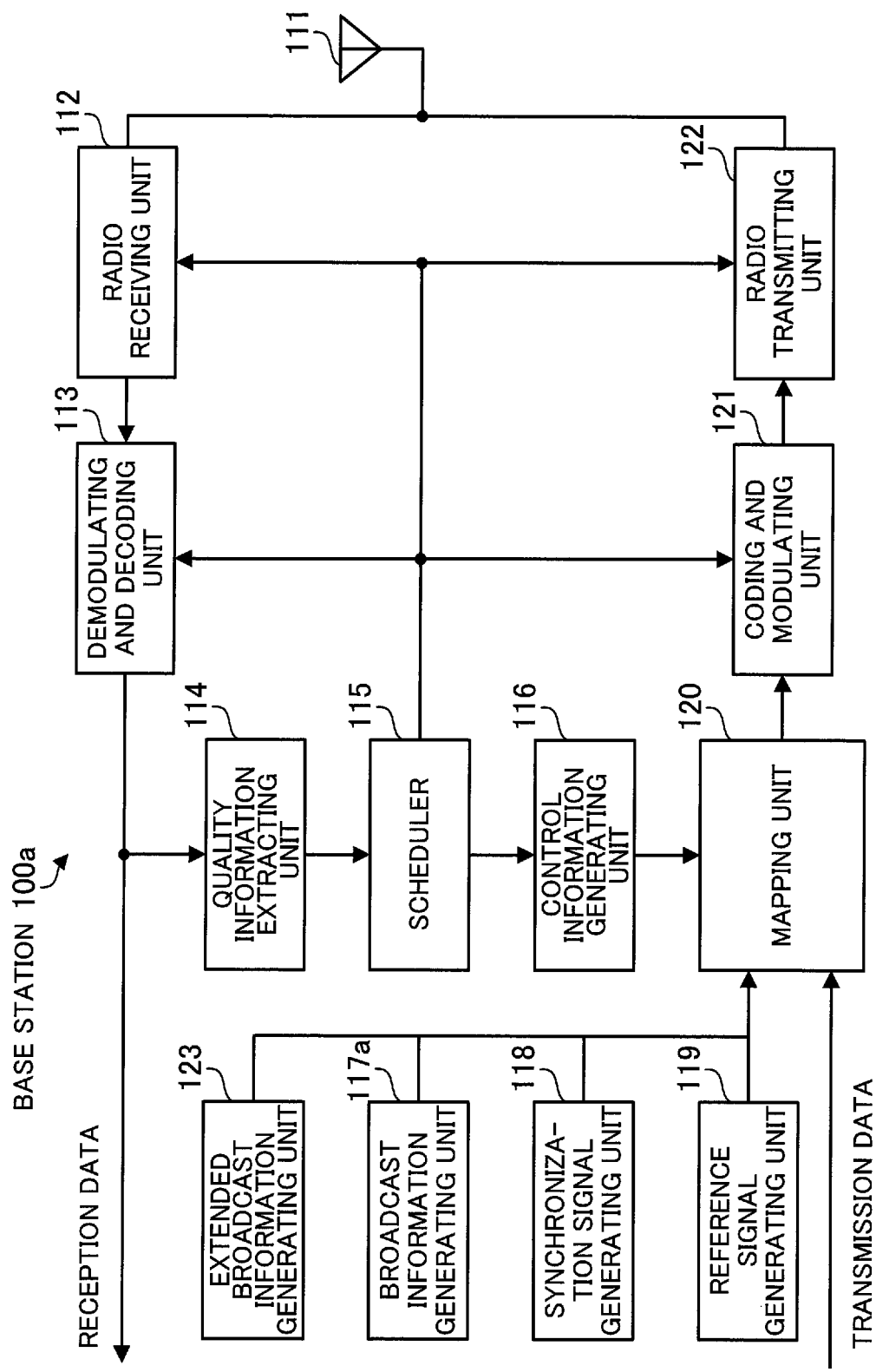
FIG. 15 is a block diagram of a base station according to a first variation of the second embodiment.

FIG. 15 is a block diagram of a base station 100a according to a first variation of the second embodiment. The base station 100a of the first variation transmits information to be used for generation of relay information on the E-PBCH in place of the PBCH. The base station 100a includes a broadcast information generating unit 117a in place of the broadcast information generating unit 117 of the base station 100. The base station 100a further includes an extended broadcast information generating unit 123.

The broadcast information generating unit 117a generates broadcast information to be transmitted on the PBCH. This broadcast information includes information to be commonly referred to by the mobile stations 300 and 400 and a relay station 200c (described below) for controlling communication. The broadcast information, however, does not include information (e.g., information indicating the communication timing between the base station 100a and the relay station 200c) to be used for generation of relay information. The extended broadcast information generating unit 123 generates extended broadcast information to be transmitted on the E-PBCH. This extended broadcast information includes information to be used for generation of relay information.

Figure 16:
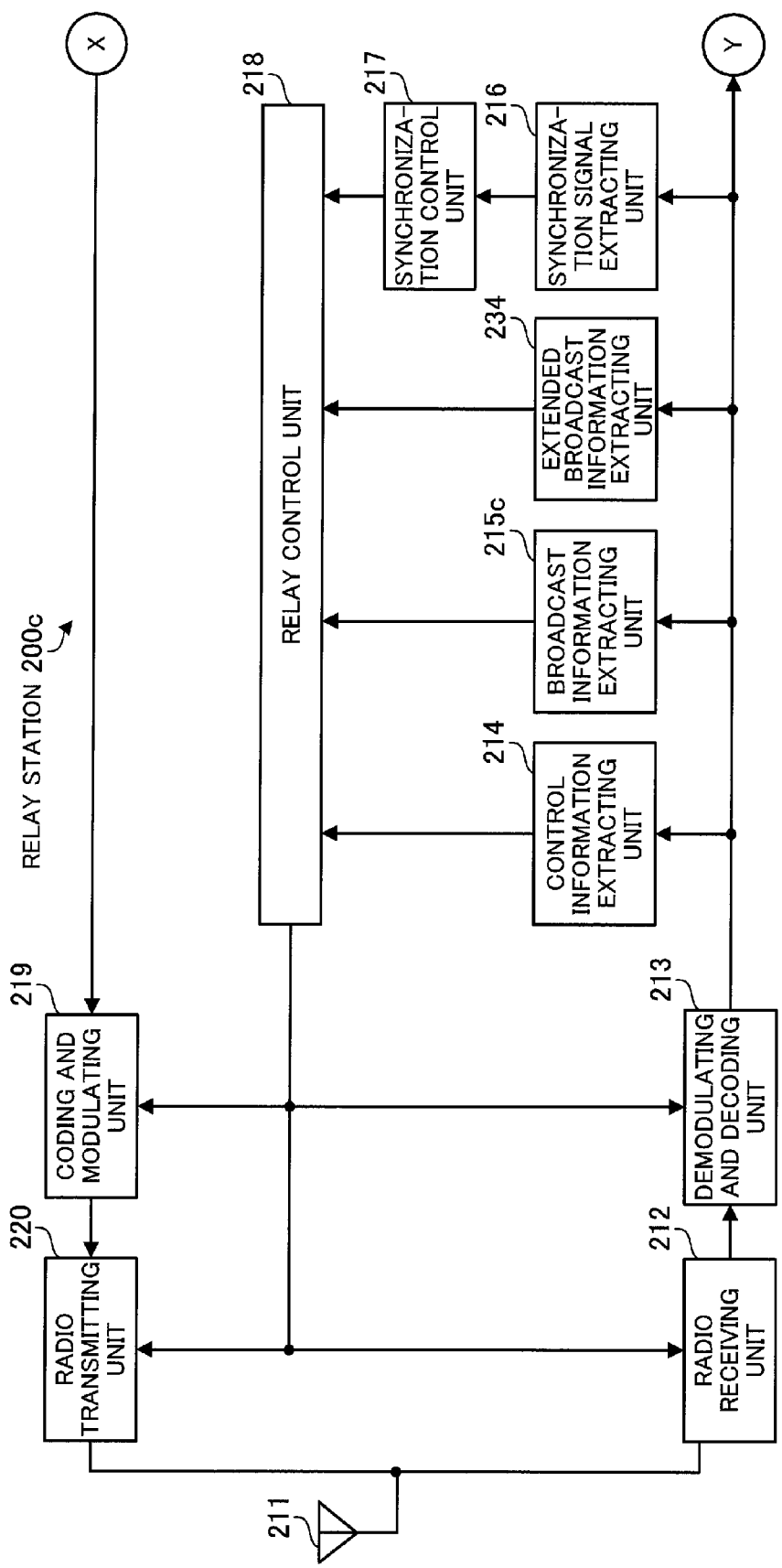
FIG. 16 is a block diagram of a relay station according to the first variation.

FIG. 16 is a block diagram of the relay station 200c according to the first variation. The relay station 200c of the first variation receives information to be used for generation of relay information on the E-PBCH from the base station 100a. The relay station 200c includes a broadcast information extracting unit 215c in place of the broadcast information extracting unit 215 of the relay station 200. The relay station 200c further includes an extended broadcast information extracting unit 234.

The broadcast information extracting unit 215c extracts broadcast information transmitted on the PBCH by the base station 100a. As mentioned above, this broadcast information includes information to be commonly referred to by the relay station 200c and the mobile stations 300 and 400 for controlling communication. The broadcast information, however, does not include information to be used for generation of relay information. The extended broadcast information extracting unit 234 extracts extended broadcast information transmitted on the E-PBCH by the base station 100a. As mentioned above, this extended broadcast information includes information to be used for generation of relay information by the relay station 200c.

Figure 17:
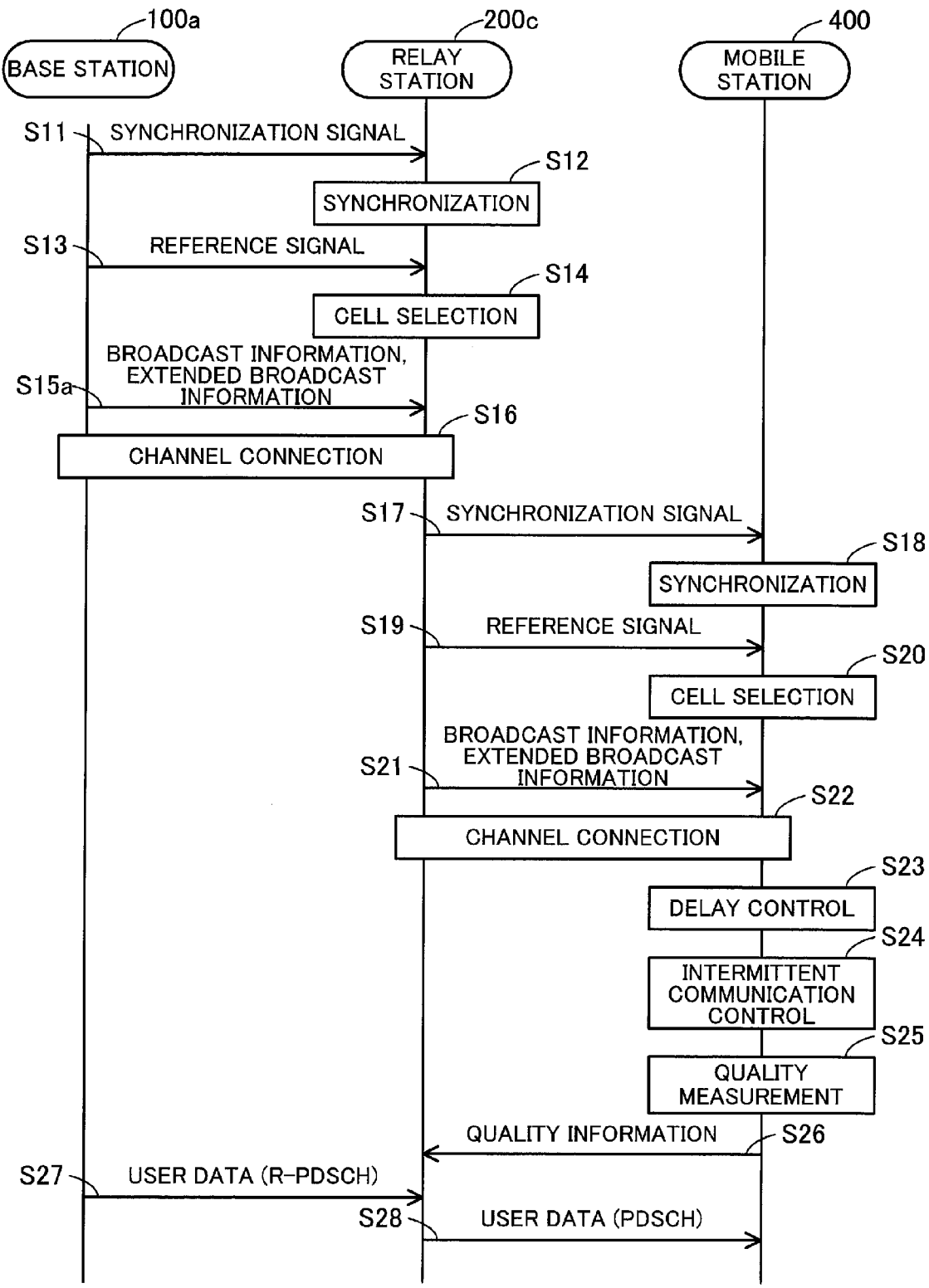
FIG. 17 is a sequence diagram illustrating communication via the relay station according to the first variation.

FIG. 17 is a sequence diagram illustrating communication via the relay station 200c according to the first variation. In the exemplary sequence illustrated in FIG. 17, Step S15a is executed in place of Step S15 of FIG. 13.

(Step S15a) The base station 100a transmits broadcast information on the PBCH. This broadcast information includes information indicating the bandwidth of the component carrier and the like. The base station 100a also transmits extended broadcast information on the E-PBCH. This extended broadcast information includes information (e.g., RS timing information) to be used for generation of relay information to be broadcasted by the relay station 200c. The relay station 200c receives the broadcast information and extended broadcast information from the base station 100a.

Figure 18:
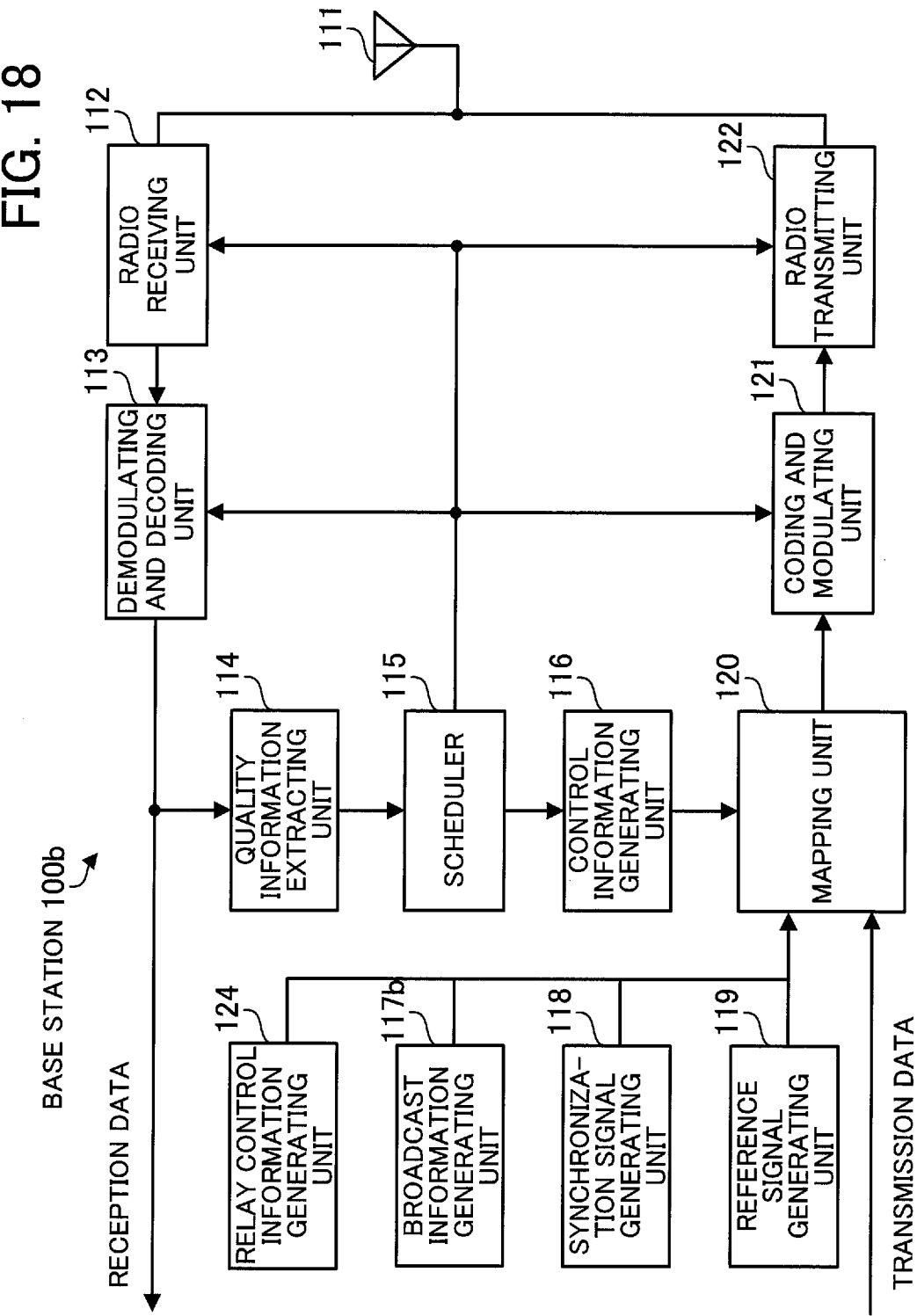
FIG. 18 is a block diagram of a base station according to a second variation of the second embodiment.

FIG. 18 is a block diagram of a base station 100b according to a second variation of the second embodiment. The base station 100b of the second variation transmits information to be used for generation of relay information on the R-PDCCH in place of the PBCH. The base station 100b includes a broadcast information generating unit 117b in place of the broadcast information generating unit 117 of the base station 100. The base station 100b further includes a relay control information generating unit 124.

The broadcast information generating unit 117b generates broadcast information to be transmitted on the PBCH. This broadcast information includes information to be commonly referred to by the mobile stations 300 and 400 and a relay station 200d (described below) for controlling communication. The broadcast information, however, does not include information (e.g., information indicating the communication timing between the base station 100a and the relay station 200d) to be used for generation of relay information. The relay control information generating unit 124 generates control information to be transmitted on the R-PDCCH to the relay station 200d. This control information includes information to be used for generation of relay information.

The relay station 200d may be implemented with the same configuration as that of the relay station 200 illustrated in FIGS. 10 and 11. In that case, the control information extracting unit 214 extracts the information to be used for generation of relay information which has been transmitted on the R-PDCCH by the base station 100b to the relay station 200d.

Figure 19:
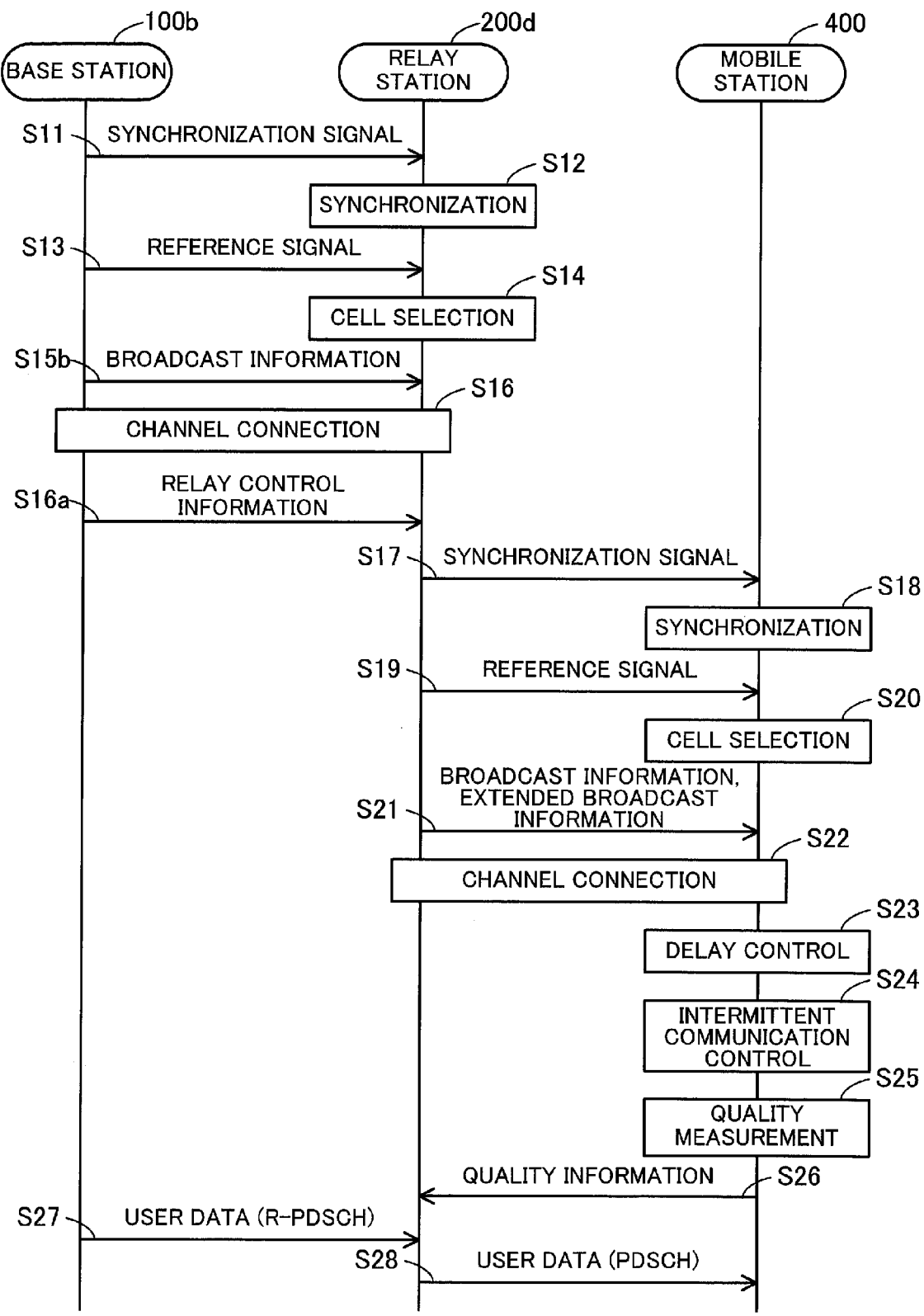
FIG. 19 is a sequence diagram illustrating communication via a relay station according to the second variation.

FIG. 19 is a sequence diagram illustrating communication via the relay station 200d according to the second variation. In the exemplary sequence illustrated in FIG. 19, Step S15b is executed in place of Step S15 of FIG. 13. Further, Step S16a is executed between Step S16 and Step S17.

(Step S15b) The base station 100b transmits broadcast information on the PBCH. This broadcast information includes information indicating the bandwidth of the component carrier and the like. The broadcast information, however, does not include information (e.g., RS timing information) to be used for generation of relay information. The relay station 200d receives the broadcast information from the base station 100b.

(Step S16a) The base station 100b transmits control information for relay control on the R-PDCCH after performing processing of channel connection. This control information includes information to be used for generation of relay information. The relay station 200d receives the control information from the base station 100b.

As mentioned earlier, it is likely that the base station 100b updates information (e.g., RS timing information) to be used for generation of relay information. Therefore, the base station 100b may transmit the control information on the R-PDCCH to the relay station 200d every time an update is made, or may regularly transmit the control information to the relay station 200d. The relay station 200d generates relay information on the basis of the latest control information received from the base station 100b.

Figure 20:
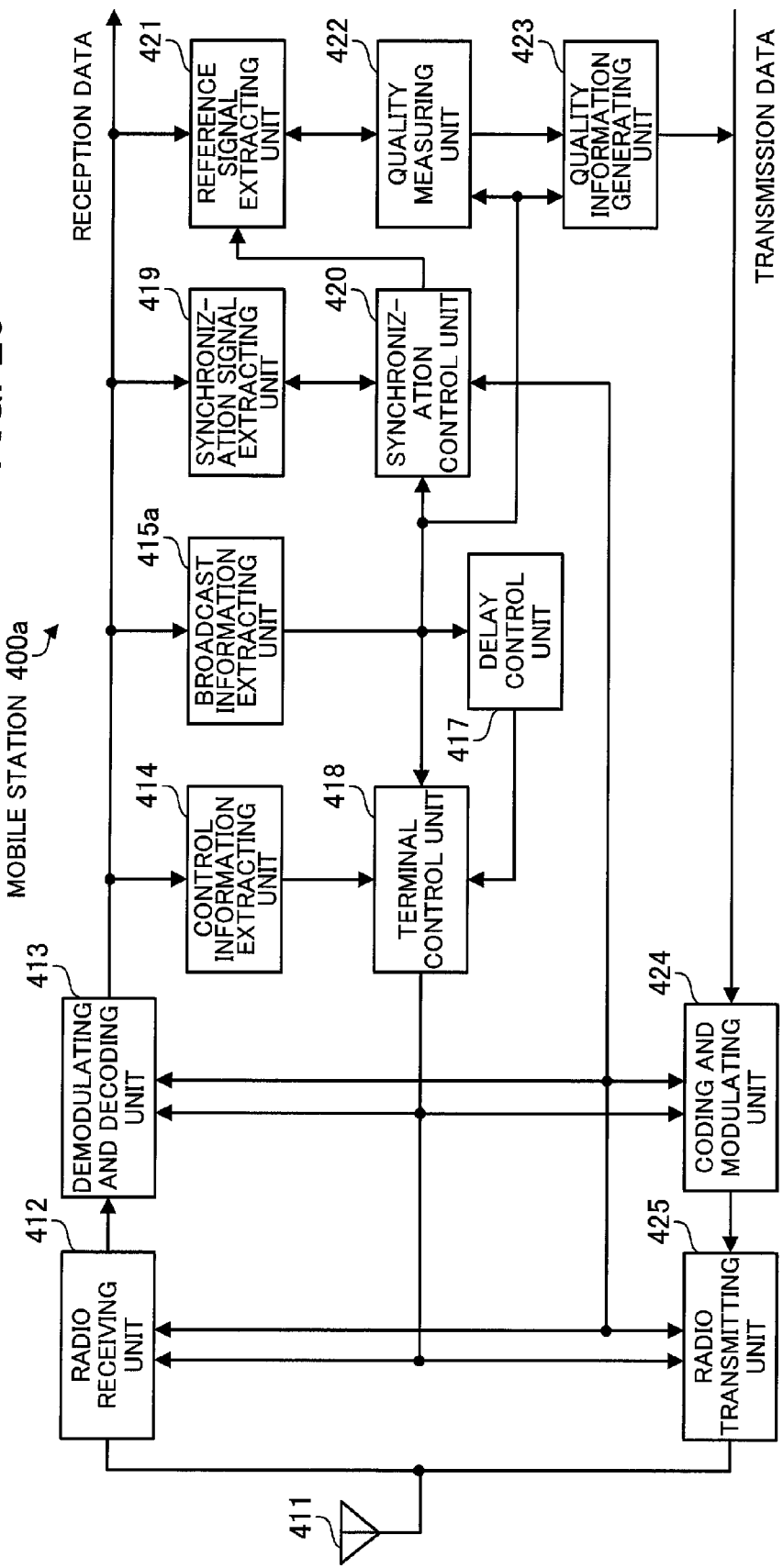
FIG. 20 is a block diagram of a mobile station according to a third variation of the second embodiment.

FIG. 20 is a block diagram of a mobile station 400a according to a third variation of the second embodiment. The mobile station 400a of the third variation receives relay information on the PBCH from a relay station 200e (described below) of the third variation. The mobile station 400a includes a broadcast information extracting unit 415a in place of the broadcast information extracting unit 415 of the mobile station 400. On the other hand, the mobile station 400a does not have to include the extended broadcast information extracting unit 416.

The broadcast information extracting unit 415a extracts broadcast information transmitted on the PBCH by the relay station 200e. This broadcast information includes information indicating the bandwidth of the component carrier on which the broadcast information is transmitted. The broadcast information also includes relay information, which includes information about use by the RS, the RS timing, the RS transmission power, the number of hops and the like. The broadcast information extracting unit 415a distributes the contents of the extracted broadcast information to the delay control unit 417, the terminal control unit 418, the synchronization control unit 420, the quality measuring unit 422, and the quality information generating unit 423, in accordance with the type of information.

It is to be noted that the relay station 200e may be implemented with the same configuration as that of the relay station 200 illustrated in FIGS. 10 and 11. In that case, the broadcast information generating unit 228 generates broadcast information including relay information in accordance with an instruction from the relay control unit 218.

Figure 21:
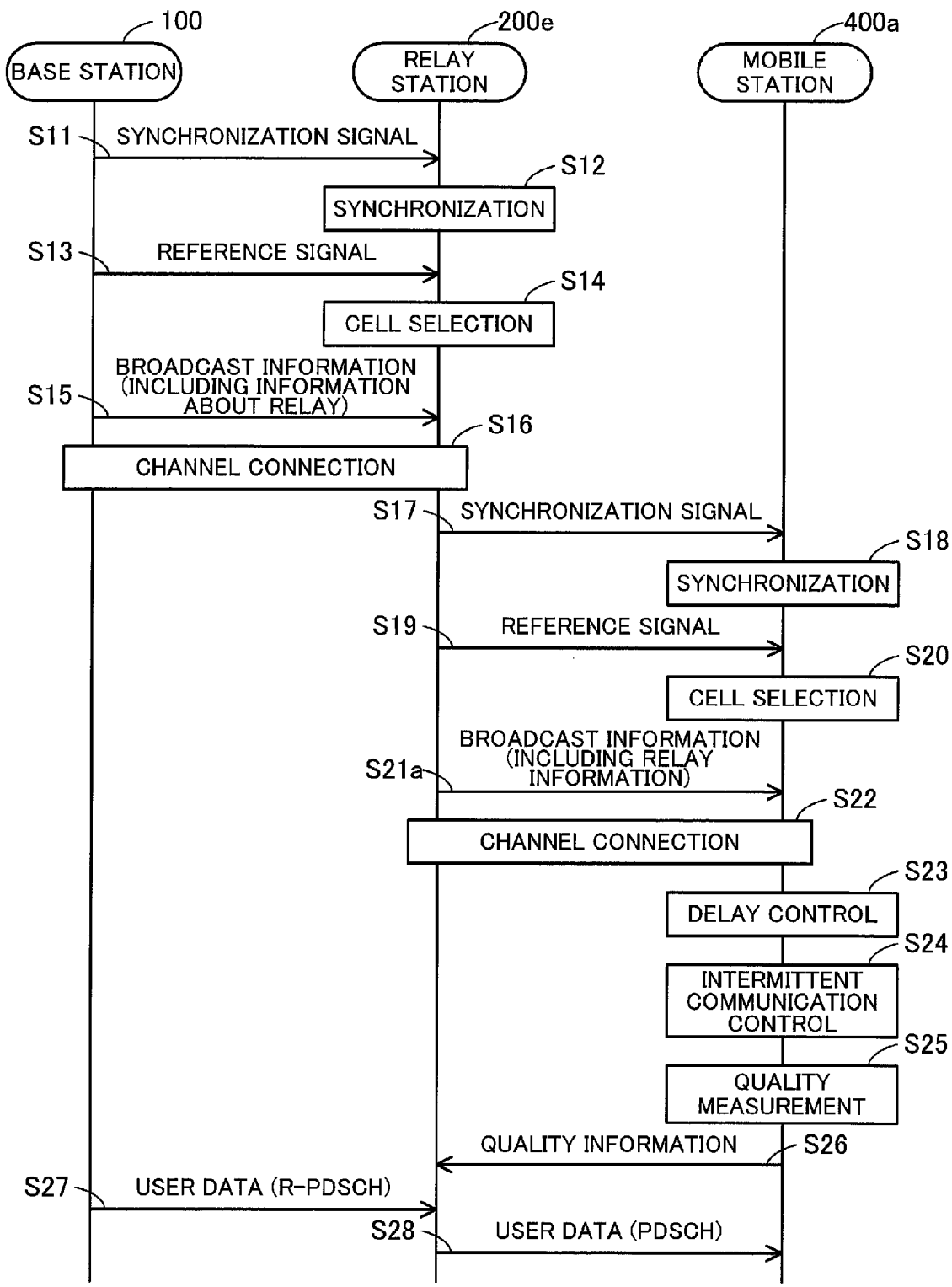
FIG. 21 is a sequence diagram illustrating communication via a relay station according to the third variation.

FIG. 21 is a sequence diagram illustrating communication via the relay station 200e according to the third variation. In the exemplary sequence illustrated in FIG. 21, Step S21a is executed in place of Step S21 of FIG. 13.

(Step S21a) The relay station 200e generates broadcast information thereof using the broadcast information received in Step S15, and transmits the generated broadcast information on the PBCH. This broadcast information includes information indicating the bandwidth of the component carrier and the like. The broadcast information also includes relay information, which includes information about use by the RS, the RS timing, the RS transmission power, the number of hops and the like. That is, the relay station 200e transmits both the relay information and other information included in the broadcast information on the PBCH. The mobile station 400a receives the broadcast information from the relay station 200e.

It is to be noted that, although the base station 100 determines the RS timing and reports the determined RS timing to the relay station 200 in the second embodiment described above, the relay station 200 may determine the RS timing and report the determined RS timing to the base station 100. In that case, the relay station 200 may transmit the RS timing information to the base station 100 using an uplink control channel established between the base station 100 and the relay station 200.

Further, in the second embodiment described above, the cell of the relay station 200 has a different cell ID from that of the cell of the base station 100, and the mobile station 400 distinguishes the cell of the relay station 200 from the cell of the base station 100. However, the method of broadcasting the relay information described above may be applied to a system in which the mobile station 400 recognizes the cell of the relay station 200 as a part of the cell of the base station 100.

According to the mobile communication system described above, the mobile station 400 is able to appropriately control radio communication via the relay station 200 (the relay station 200*a*, or the relay station 200*b*). That is, the mobile station 400 is able to recognize that a cell to be accessed is a cell of a relay station and also detect the component carrier used by the relay station, by receiving the broadcasted relay information. Further, the mobile station 400 is able to detect the transmission timing of the relay station to which the mobile station 400 is to connect, and thus is able to intermittently stop radio signal processing. Thus, power consumption is reduced.

Assume that radio communication between the base station 100 and the relay station 200 is performed using four sub-frames out of ten sub-frames included in a radio frame, for example. If the mobile station 400 does not recognize this communication timing, the mobile station 400 receives radio signals from the relay station 200 in all the sections (ten sub-frames), and determines whether data to the mobile station 400 are present or not. On the other hand, if the mobile station 400 recognizes this communication timing, the mobile station 400 is able to determine that there is no need to receive radio signals from the relay station 200 in the four sub-frames. Accordingly, in this case, the load of reception processing can be reduced to 6/10, which allows reduction of power consumption by the mobile station 400.

Further, the mobile station 400 is able to recognize the transmission power of the relay stations 200, 200*a*, and 200*b*, and thus calculate the propagation loss on the basis of the transmission power and the receiving power. Accordingly, even if the transmission power of the relay stations 200, 200*a*, and 200*b* differs from the transmission power of the base station 100, the mobile station 400 is able to appropriately perform cell selection and transmission power control. Also, the mobile station 400 is able to recognize the number of hops between the base station 100 and the mobile station 400, and thus perform transmission delay control in accordance with the number of hops.

According to the mobile communication system, the radio relay apparatus, the mobile communication apparatus, and the radio communication method described above, communication via a radio relay apparatus can be controlled appropriately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communication system comprising:
    a base station apparatus;
    a radio relay apparatus; and
    a plurality of mobile communication apparatuses;
    wherein the base station apparatus includes:
        a first generating unit configured to generate first broadcast information that includes information to be used in processing by a first of the mobile communication apparatuses that connects to the base station apparatus and in processing by a second of the mobile communication apparatuses that connects to the radio relay apparatus; and
        a first transmitting unit configured to transmit the first broadcast information;
    wherein the radio relay apparatus includes:
        a receiver configured to receive the first broadcast information;
        a second generating unit configured to generate second broadcast information that includes information to be used in processing by the second mobile communication apparatus; and
        a second transmitting unit configured to transmit the second broadcast information; and
    wherein the second mobile communication apparatus includes:
        a receiving unit configured to receive the first broadcast information and the second broadcast information; and
        a control unit configured to control a radio connection with the radio relay apparatus, using the received first broadcast information and second broadcast information, and to control a radio connection using the first broadcast information when connecting to the base station.

2. The mobile communication system according to claim 1, wherein
    the second transmitting unit transfers the first broadcast information on a first broadcast channel, the first broadcast information having been transmitted by the base station apparatus, and transmits the second broadcast information on a second broadcast channel or the first broadcast channel.

3. The mobile communication system according to claim 2, wherein
    a radio resource in which the first broadcast channel is located and another radio resource in which the second broadcast channel is located are adjacent to each other in time, in frequency, or in both time and frequency.

4. The mobile communication system according to claim 1, wherein
    the receiving unit receives the first broadcast information from the base station apparatus or the radio relay apparatus.

5. The mobile communication system according to claim 1, wherein
    the second generating unit generates the second broadcast information based on the information received from the base station apparatus.

6. The mobile communication apparatus according to claim 5, wherein
    the first transmitting unit transmits the information to be used for generation of the second broadcast information on a broadcast channel, or transmits the information to be used for generation of the second broadcast information on a control channel to the radio relay apparatus.

7. The mobile communication system according to claim 1, wherein
    a second broadcast channel includes information about a radio resource available to the radio relay apparatus, among radio resources used by the mobile communication system.

8. The mobile communication system according to claim 1, wherein
the second broadcast information includes timing information about a timing of radio communication by the radio relay apparatus.

9. The mobile communication system according to claim 8, wherein
the timing information indicates a timing at which radio communication is performed between the base station apparatus and the radio relay apparatus or a timing at which radio communication is not performed between the base station apparatus and the radio relay apparatus.

10. The mobile communication system according to claim 8, wherein
the timing information indicates a timing at which radio communication is performed between the radio relay apparatus and the second mobile communication apparatus or a timing at which radio communication is not performed between the radio relay apparatus and the second mobile communication apparatus.

11. The mobile communication system according to claim 1, wherein
the second broadcast information includes information about a transmission power of the radio relay apparatus.

12. The mobile communication system according to claim 1, wherein
the second broadcast information includes information about a number of relays between the base station apparatus and the second mobile communication apparatus.

13. A radio relay apparatus comprising:
a receiving unit configured to receive, from a base station apparatus, first broadcast information that includes information to be used in processing by a first mobile communication apparatus that connects to the base station apparatus and in processing by a second mobile communication apparatus that connects to the radio relay apparatus;
a generating unit configured to generate second broadcast information that includes information to be used in processing by the second mobile communication apparatus; and
a transmitting unit configured to transmit the received first broadcast information and the generated second broadcast information for controlling a radio connection performed by the second mobile communication apparatus.

14. A mobile communication apparatus comprising:
a receiving unit configured to receive first broadcast information and second broadcast information, the first broadcast information that includes information being to be used in processing by a first mobile communication apparatus that connects to a base station apparatus and in processing by a second mobile communication apparatus that connects to a radio relay apparatus, the second broadcast information that includes information being to be used in processing by the second mobile communication apparatus; and
a control unit configured to control a radio connection with the radio relay apparatus, using the received first broadcast information and second broadcast information, and to control a radio connection using the first broadcast information when connecting to the base station.

15. The mobile communication system according to claim 2, wherein
the first broadcast channel is PBCH (Physical Broadcast CHannel) in LTE (Long Term Evolution)-Advanced system, and
the second broadcast channel is E-PBCH (Extended-Physical Broadcast CHannel) in LTE-Advanced system.

16. The mobile communication system according to claim 2, wherein
the second broadcast channel includes information about a radio resource available to the radio relay apparatus, among radio resources used by the mobile communication system.

17. The radio relay apparatus according to claim 13, wherein
the transmitting unit transmits the first broadcast information via PBCH (Physical Broadcast CHannel) in LTE (Long Term Evolution)-Advanced system, and transmits the second broadcast information via PBCH or E-PBCH (Extended-Physical Broadcast CHannel) in LTE-Advanced system.

* * * * *